United States Patent
Tsuda et al.

(10) Patent No.: US 10,628,069 B2
(45) Date of Patent: Apr. 21, 2020

(54) MANAGEMENT APPARATUS FOR MANAGING AND REDUPLICATION OF VOLUMES OF A STORAGE SYSTEM WITH RESPECT TO OS TYPE

(71) Applicant: HITACHI, LTD., Tokyo (JP)

(72) Inventors: Atsushi Tsuda, Tokyo (JP); Masakazu Kobayashi, Tokyo (JP); Yuichiro Nagashima, Tokyo (JP); Tetsuya Uehara, Tokyo (JP); Yohei Tsujimoto, Tokyo (JP)

(73) Assignee: HITACHI LTD., Tokyo (JP)

( * ) Notice: Subject to any disclaimer, the term of this patent is extended or adjusted under 35 U.S.C. 154(b) by 4 days.

(21) Appl. No.: 16/085,373

(22) PCT Filed: Jun. 3, 2016

(86) PCT No.: PCT/JP2016/066643
§ 371 (c)(1),
(2) Date: Sep. 14, 2018

(87) PCT Pub. No.: WO2017/208450
PCT Pub. Date: Dec. 7, 2017

(65) Prior Publication Data
US 2019/0087116 A1    Mar. 21, 2019

(51) Int. Cl.
*G06F 3/06* (2006.01)
*G06F 9/455* (2018.01)

(52) U.S. Cl.
CPC ............ *G06F 3/0641* (2013.01); *G06F 3/067* (2013.01); *G06F 3/0608* (2013.01);
(Continued)

(58) Field of Classification Search
CPC .... G06F 3/0608; G06F 3/0629; G06F 3/0641; G06F 3/0644; G06F 3/0647;
(Continued)

(56) References Cited

U.S. PATENT DOCUMENTS 8,751,463 B1 * 6/2014 Chamness ............. G06F 3/0641
707/693
9,268,784 B1 * 2/2016 Guo ...................... G06F 3/0641
(Continued)

FOREIGN PATENT DOCUMENTS

JP    2009-230661 A    10/2009
JP    2013-047933 A    3/2013
JP    2014-178939 A    9/2014

OTHER PUBLICATIONS

J. Roemer, M. Groman, Z. Yang, Y. Wang, C. C. Tan and N. Mi, "Improving Virtual Machine Migration via Deduplication," 2014 IEEE 11th International Conference on Mobile Ad Hoc and Sensor Systems, Philadelphia, PA, 2014, pp. 702-707. (Year: 2014).*
(Continued)

*Primary Examiner* — Reginald G Bragdon
*Assistant Examiner* — Aaron D Ho
(74) *Attorney, Agent, or Firm* — Volpe and Koenig, P.C.

(57) ABSTRACT

A management apparatus, which is configured to manage at least one storage system, includes a processor and a memory. Each of the at least one storage apparatus includes a plurality of volumes, each of which stores at least one OS. The processor is configured to: determine, for each of the plurality of volumes, an OS type and version of a representative OS of the each of the plurality of volumes; select, from among the plurality of volumes, a plurality of volumes having representative OSes that share the same OS type and major version; and include the selected plurality of volumes in one deduplication group made up of volumes among which deduplication is to be executed.

13 Claims, 21 Drawing Sheets

(52) U.S. Cl.
CPC .......... *G06F 3/0629* (2013.01); *G06F 3/0644* (2013.01); *G06F 3/0647* (2013.01); *G06F 3/0665* (2013.01); *G06F 3/0689* (2013.01); *G06F 9/45558* (2013.01); *G06F 2009/45583* (2013.01)

(58) Field of Classification Search
CPC ...... G06F 3/0665; G06F 3/067; G06F 3/0689; G06F 9/45558; G06F 2009/45583
See application file for complete search history.

(56) References Cited

U.S. PATENT DOCUMENTS

| | | | |
|---|---|---|---|
| 2009/0182789 A1* | 7/2009 | Sandorfi | G06F 11/1004 |
| 2009/0248979 A1 | 10/2009 | Kobayashi et al. | |
| 2010/0199065 A1* | 8/2010 | Kaneda | G06F 3/0608 |
| | | | 711/209 |
| 2013/0054894 A1 | 2/2013 | Kawaguchi | |
| 2013/0097380 A1* | 4/2013 | Colgrove | G06F 3/0608 |
| | | | 711/118 |
| 2013/0339316 A1* | 12/2013 | Hirsch | G06F 3/0641 |
| | | | 707/692 |
| 2014/0279956 A1* | 9/2014 | Trimble | G06F 3/0641 |
| | | | 707/692 |

OTHER PUBLICATIONS

International Search Report for WO 2017/208450 A1, dated Jul. 26, 2016.

\* cited by examiner

| HOST IDENTIFIER | OS TYPE | OS VERSION | HYPERVISOR | HYPERVISOR IDENTIFIER | VM-ALLOCATED CAPACITY |
|---|---|---|---|---|---|
| HOGE | OS_A | 6.1 | FALSE | BAR | 2G |
| FUGA | OS_A | 6.0 | FALSE | BAR | 2G |
| PIYO | OS_B | 7.2 | FALSE | - | - |
| FOO | OS_C | 12.04 | FALSE | BAR | 4G |
| BAR | OS_D | 5.0 | TRUE | - | - |
| DAA | OS_A | 6.1 | FALSE | BAR | 3G |
| ... | ... | ... | ... | ... | ... |

HOST TABLE (ON STORAGE MANAGEMENT COMPUTER)

*FIG. 7*

| VOL IDENTIFIER | VOL TYPE | STORAGE IDENTIFIER |
|---|---|---|
| 00:00:01 | DATA STORE | 01 |
| 00:00:02 | STANDARD | 01 |
| ... | ... | ... |

VOL TABLE (ON STORAGE MANAGEMENT COMPUTER)

*FIG. 8*

| VOL IDENTIFIER | HOST IDENTIFIER | STORAGE IDENTIFIER |
|---|---|---|
| 00:00:01 | BAR | 01 |
| 00:00:02 | PIYO | 01 |
| ... | ... | ... |

VOL ALLOCATION TABLE (ON STORAGE MANAGEMENT COMPUTER)

*FIG. 9*

| MINIMUM VOL COUNT | MAXIMUM VOL COUNT |
|---|---|
| 10 | 1000 |

GROUP'S VOL COUNT THRESHOLD TABLE
(ON STORAGE MANAGEMENT COMPUTER)

| GROUP IDENTIFIER | OS TYPE | OLDEST VERSION | LATEST VERSION |
|---|---|---|---|
| OS_A-6_0-6_1 | OS_A | 6.0 | 6.1 |
| OS_B-5 | OS_B | 5.0 | 5.11 |
| ... | ... | ... | ... |

DEDUPLICATION GROUP TABLE (ON STORAGE MANAGEMENT COMPUTER)

| VOL IDENTIFIER | STORAGE IDENTIFIER | GROUP IDENTIFIER |
|---|---|---|
| 00:00:02 | 01 | OS_B-5 |
| 00:00:01 | 01 | OS_A-6_0-6_1 |
| ... | ... | ... |

VOL GROUP TABLE (ON STORAGE MANAGEMENT COMPUTER)

★DEDUPLICATION GROUP LIST★

| STORAGE NAME | | | SA_A | | COMPRESSION RATIO | | 40% |
|---|---|---|---|---|---|---|---|
| POST-COMPRESSION CAPACITY | | | 30TB | | PRE-COMPRESSION TOTAL CAPACITY | | 50TB |
| TOTAL VOL COUNT | | | 1500 | | TOTAL GROUP COUNT | | 100 |

| STORAGE NAME |
|---|
| ▼SA_A |
| △SA_B |
| △SA_C |

| NAME | PRE-COMPRESSION CAPACITY | POST-COMPRESSION CAPACITY | COMPRESSION RATIO | OS | OLDEST OS VERSION | LATEST OS VERSION |
|---|---|---|---|---|---|---|
| GR_A | 10TB | 5TB | 50% | OS_A | 6.0 | 6.1 |
| GR_B | 15TB | 10TB | 33% | OS_B | 5.3 | 5.5 |
| GR_C | 12TB | 4TB | 67% | OS_C | 11.04 | 12.10 |

FIG. 24

★ DEDUPLICATION GROUP MEMBER VOL LIST ★

| STORAGE NAME ▼SA_A | GROUP NAME | GR_B | COMPRESSION RATIO | 33% |
|---|---|---|---|---|
| GROUP NAME GR_A | POST-COMPRESSION CAPACITY | 10TB | PRE-COMPRESSION TOTAL CAPACITY | 15TB |
| GR_B | TOTAL VOL COUNT | 8 | OS | OS_B |
| GR_C | OLDEST OS VERSION | 5.3 | LATEST OS VERSION | 5.5 |

| NAME | PRE-COMPRESSION CAPACITY | POST-COMPRESSION CAPACITY | COMPRESSION RATIO | OS VERSION | ALLOCATION DESTINATION HOST |
|---|---|---|---|---|---|
| VOL_A | 1TB | 800GB | 20% | 5.3 | HOGE |
| VOL_B | 500GB | 200GB | 60% | 5.4 | FUGA |
| VOL_C | 800GB | 700GB | 13% | 5.5 | PIYO |

STORAGE NAME △SA_B

STORAGE NAME △SA_C

*FIG. 25*

★NEW VOL ALLOCATION DIALOG★

ALLOCATION DESTINATION HOST:

| HOST NAME | OS | OS VERSION |
|---|---|---|
| DAA | OS_B | 6.0 |

NEW VOL CAPACITY: 500GB

DEDUPLICATION GROUP: Gr_B : OS_B : 6.0-6.1

EXECUTE    CANCEL

FIG. 26

MANAGEMENT APPARATUS FOR MANAGING AND REDUPLICATION OF VOLUMES OF A STORAGE SYSTEM WITH RESPECT TO OS TYPE

BACKGROUND

This invention relates to a management apparatus for a storage system.

The amount of data kept by a corporation or an individual is ever increasing, and the need is accordingly increasing for a function for reducing the cost per bit. To fulfill the need, storage vendors have proposed technologies with which the amount of storable data is expanded by compressing and saving data inside a storage system.

In Patent Literature 1, there is disclosed a technology with which, when data in a thin provisioning volume is updated, pool volumes storing the same data block are selected from among volumes including an external storage system to execute data deduplication. Specifically, a configuration cited below is disclosed in Patent Literature 1.

"In order to improve the efficiency of deduplication, a storage system includes a controller, a plurality of external volumes mounted to an external apparatus, and a plurality of first volumes. A controller stores relevant data obtained from one of the plurality of first volumes in a first external volume among the plurality of external volumes. The controller receives object data from a server, and allocates the object data to a plurality of pool volumes. The plurality of pool volumes include the plurality of external volumes mounted to the external apparatus. The controller stores the object data in the plurality of pool volumes based on object allocation information, which is received from a backup server." (See "Abstract").

Patent Literature 1: JP 2013-047933 A

SUMMARY

Data compression by way of deduplication increases available space by searching for duplicate data among volumes that make up a deduplication group and removing the duplicate data. To benefit from the full effect of compression by deduplication, it is important to configure an appropriate deduplication group in which volumes belonging to the deduplication group store many pieces of duplicate data. When the system is to simulate all possible grouping patterns for deduplication groups, however, the calculation amount of the simulation is enormous and imposes heavy processing load on the system.

According to a representative embodiment of this invention, there is provided a management apparatus, which is configured to manage at least one storage system, the management apparatus including a processor and a memory, wherein each of the at least one storage apparatus includes a plurality of volumes, each of which stores at least one OS, and wherein the processor is configured to: determine, for each of the plurality of volumes, an OS type and version of a representative OS of the each of the plurality of volumes; select, from among the plurality of volumes, a plurality of volumes having representative OSes that share the same OS type and major version; and include the selected plurality of volumes in one deduplication group made up of volumes among which deduplication is to be executed.

According to one embodiment of this invention, a deduplication group conducive to high effect of compression by deduplication can be configured efficiently.

BRIEF DESCRIPTION OF THE DRAWINGS

FIG. 7 is a table for showing a configuration example of the host table.

FIG. 8 is a table for showing a configuration example of the VOL table.

FIG. 9 is a table for showing a configuration example of the VOL allocation table.

FIG. 10 is a table for showing a configuration example of the group's VOL count threshold table.

FIG. 11 is a table for showing a configuration example of the deduplication group table.

FIG. 12 is a table for showing a configuration example of the VOL group table.

FIG. 24 is a diagram for illustrating an example of an image of a deduplication group list.

FIG. 25 is a diagram for illustrating an example of an image of a deduplication group member volume list.

FIG. 26 is a diagram for illustrating an example of an image for the allocation of a new volume by the user.

DETAILED DESCRIPTION OF THE EMBODIMENTS

An embodiment of this invention is described below with reference to the drawings. However, the embodiment is merely an example of how this invention is carried out, and is not to limit the technical scope of this invention. Components common to different drawings are denoted by the same reference symbols.

Information in this invention is referred to as "table" in the following description, but is not necessarily expressed in the data structure of a table, and may be expressed in the data structure of a "list", a "database (DB)", or a "queue", or other forms. A "table", a "list", a "DB", a "queue" and the like may therefore simply be referred to as "information" in order to indicate no dependence on data structure. Expressions "identification information", "identifier", "name", and "ID" may be used in the descriptions of pieces of information, and are substitutable with one another.

The following description has "program" as the subject or the agent in a sentence. However, because a program is executed by a processor to execute predetermined processing with the use of a memory and a communication port (communication control apparatus), the description may be read as a description having the processor as the subject or the agent in a sentence, or a description having a controller as the subject or the agent. Processing disclosed with a program as the subject or the agent in a sentence may be read as processing executed by a management server (management apparatus) or a similar computer or an information processing apparatus. Some or all of programs may be implemented by dedicated hardware, or may be in the form of a module. The programs may be installed on computers via a program distribution server or a storage medium.

A computer system in the embodiment includes in one deduplication group a plurality of volumes in which operating systems (OSes) of the same OS type are stored. Efficient configuration of a deduplication group conducive high in compression ratio is accomplished in this manner. The computer system also includes in one deduplication group a plurality of volumes in which OSes of the same OS type and the same major version are stored.

This enhances the effect described above. A deduplication group can include volumes in which OSes of different major versions are stored, and some of volumes in which OSes of the same OS type and the same major versions are stored can be included in different deduplication groups. In some designs, a deduplication group may include volumes in which OSes of different OS types are stored.

Figure 1:
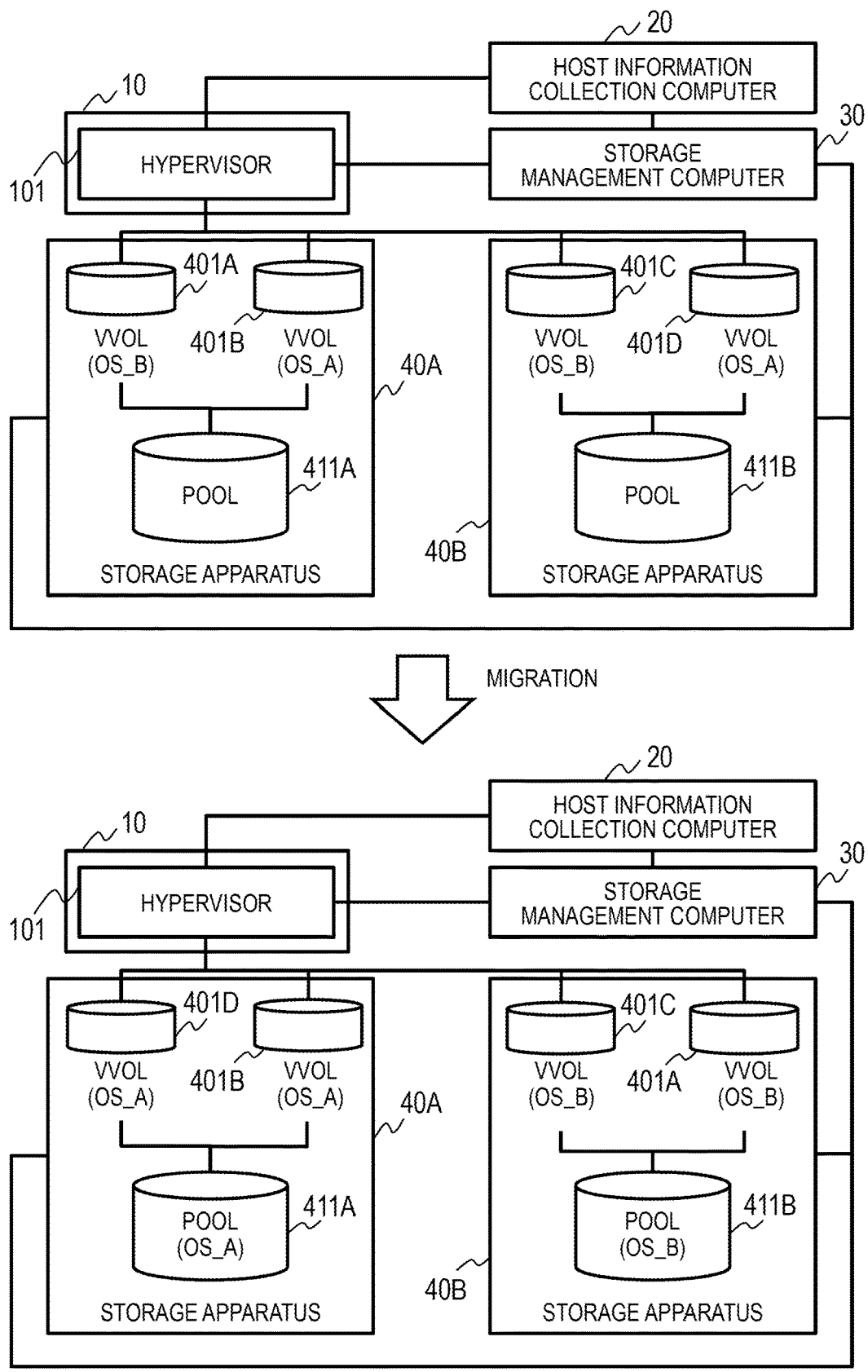
FIG. 1 is a diagram for outlining the embodiment.

FIG. 1 is a diagram for outlining the embodiment and for illustrating states before and after volume migration in a computer system. The computer system includes a host computer 10, a host information collection computer 20, a storage management computer 30, and storage apparatus 40A and 40B. The host computer 10 and the storage apparatus 40A and 40B hold communication to and from each other over a data network. The host information collection computer 20 and the storage management computer 30 hold communication to and from other apparatus over a management network.

The host information collection computer 20 obtains information about an OS to be executed from the host computer 10. The storage management computer 30 manages and controls the storage apparatus 40A and 40B.

The host computer 10 executes a virtualization control program (hypervisor) 101. The hypervisor 101 builds a virtual machine (VM) on the host computer 10. In FIG. 1, the hypervisor 101 builds a plurality of VMs. Meta data of a VM, an OS (guest OS) and application programs running on the VM, and data of the application programs are included in at least one image file.

The hypervisor 101 provides a data store, which includes at least one volume, to at least one VM. One image file is stored in one volume within the data store.

The storage apparatus 40A and 40B provide volumes 401A to 401D to the host computer 10. For example, the volumes 401A to 401D make up one data store. The volumes 401A to 401D each store image data of at least one VM. The volumes 401A and 401C store data of a VM that includes an OS whose type is OS_B. The volumes 401B and 401D store data of a VM that includes an OS whose type is OS_A.

In the example of FIG. 1, the volumes 401A to 401D are virtual volumes (VVOLs). The storage apparatus 40A and 40B include thin provisioning pools (also simply referred to as "pools") 411A and 411B, respectively, each of which includes at least one logical volume. The storage apparatus 40A and 40B build virtual volumes from the pools 411A and 411B, respectively, and provide the virtual volumes to the host computer 10. As many unit actual storage areas as required by write to a virtual volume are allocated from the pool to the virtual volume.

The storage apparatus 40A and 40B each execute deduplication in volumes included in a deduplication group. Deduplication is carried out by searching for duplicate data in target data and deleting the duplicate data. In the example of FIG. 1, volumes built from one pool are included in one deduplication group.

The system in the embodiment includes in the same deduplication group volumes in which OSes of the same type are stored. This raises the ratio of compression by deduplication because there are many duplicates among OSes of the same type.

The volumes 401A and 401C store data of OS_B, and are stored in different storage apparatus before volume migration. The volumes 401B and 401D store data of OS_A, and are stored in different storage apparatus before volume migration.

The storage management computer 30 determines which volumes are to be included in the same deduplication group from information about OSes collected by the host information collection computer 20, and causes volumes to migrate as required.

In the example of FIG. 1, the storage management computer 30 obtains information about the hypervisor 101, VMs, and volumes in which the VMs are stored from the host information collection computer 20. The storage management computer 30 determines that the volumes 401A and 401C are to be included in the same deduplication group, and that the volumes 401B and 401D are to be included in the same deduplication group.

The storage management computer 30 causes volumes to migrate so that the volumes 401A and 401C are built from the same pool and so that the volumes 401B and 401D are built from the same pool. Specifically, the storage management computer 30 causes the volume 401A to migrate from the pool 411A to the pool 411B, and causes the volume 401D to migrate from the pool 411B to the pool 411A. With volumes that store the same type of OSes included in the same deduplication group, data can be compressed by deduplication at a raised compression ratio.

Figure 2:
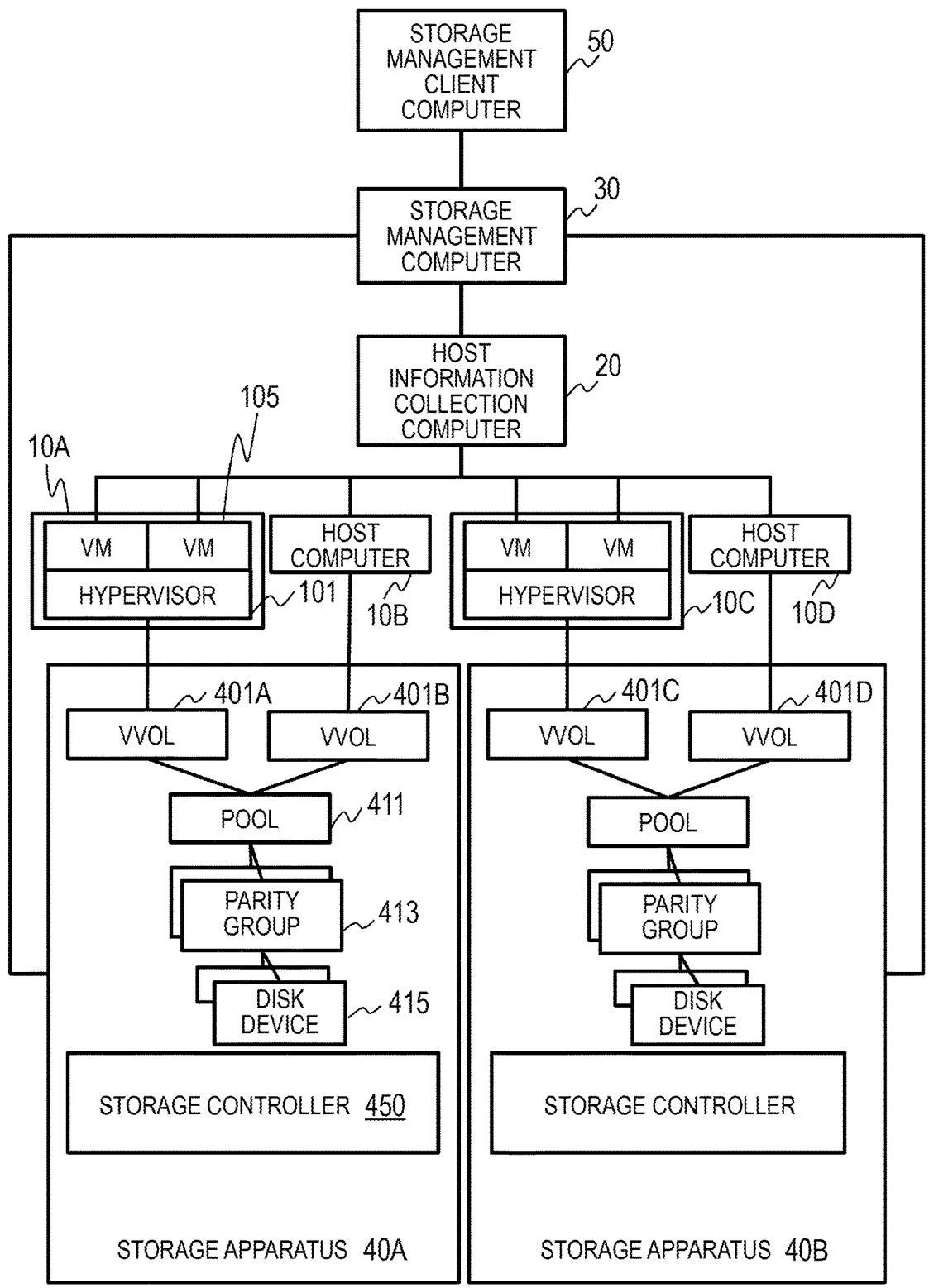
FIG. 2 is a diagram for illustrating a configuration example of the computer system.

Details of the embodiment are described below. FIG. 2 is a diagram for illustrating a configuration example of the computer system. The computer system includes host computers 10A to 10D, the host information collection computer 20, the storage management computer 30, the storage apparatus 40A and 40B, and a storage management client computer 50.

The host computers 10A to 10D and the storage apparatus 40A and 40B are coupled by a data network. The host computers 10A to 10D and the storage apparatus 40A and 40B are coupled to each other via the data network from data interfaces of the host computers 10A to 10D and the storage apparatus 40A and 40B. The data network is, for example, a Storage Area Network (SAN). The data network can be an IP network or any other type of data communication network.

The host information collection computer 20, the storage management computer 30, and the storage management client computer 50 are each coupled from their respective management interfaces to other apparatus via a management network. The management network is, for example, an IP network. The management network can be any other type of network, and may be the same network as the data network.

The storage management client computer 50 is a computer including a user interface, and is operated by a user to hold communication to and from the storage management computer 30. The storage management computer 30 manages and controls the storage apparatus 40A and 40B. The host information collection computer 20 collects management information from the host computers 10A to 10D. In particular, the host information collection computer 20 collects from the host computers 10A to 10D information about an OS to be executed. The information about an OS includes information about a volume in which the OS is stored.

The host computers 10B and 10D each execute only one OS. The host computers 10A to 10D are physical computers. The host computers 10A and 10C each execute the hypervisor (virtualization control program) 101. The hypervisor 101 provides an environment in which VMs 105 are executed.

The hypervisor 101 builds at least one VM 105 on its host computer. The hypervisor is a type of OS. A VM includes an OS (a guest OS) and can further include an application program running on the guest OS. The host computers 10A and 10C may execute virtualization control software running on a host OS to build a VM.

The storage apparatus 40A and 40B provide volumes to the host computers 10A to 10D. The hypervisor 101 builds a data store, which is made up of at least one volume provided by the storage apparatus, and stores an image file of each VM 105 in the data store. The hypervisor 101 manages which VM image file is stored in which volume, and executes read and write of the VM image file.

In the example of FIG. 2, the storage apparatus 40A provides the virtual volumes 401A and 401B to the host computers 10A and 10B, respectively. The virtual volume 401A is allocated to the hypervisor 101 of the host computer 10A, and the virtual volume 401B is allocated to the OS of the host computer 10B.

The virtual volume 401A stores data including the hypervisor 101 and the OS of the VM 105 that are executed by the host computer 10A. The virtual volume 401B stores data including an OS that is executed by the host computer 10B.

The storage apparatus 40B provides the virtual volumes 401C and 401D to the host computers 10C and 10D, respectively. The virtual volume 401C is allocated to the hypervisor 101 of the host computer 10C, and the virtual volume 401D is allocated to the OS of the host computer 10D. The virtual volume 401C stores data including the hypervisor 101 and the OS of the VM 105 that are executed by the host computer 10C. The virtual volume 401D stores data including an OS that is executed by the host computer 10D.

The storage apparatus 40A and 40B have the same configuration. The configuration of the storage apparatus 40A is described below. The storage apparatus 40A includes a storage controller 450 and disk devices 415.

The storage controller 450 controls the storage apparatus 40A. The storage controller 450 builds the pool 411, which includes a plurality of logical volumes. Each logical volume is a part of the storage area of a parity group 413. The parity group 413 is made up of a plurality of disk devices 415 having a RAID configuration (RAID stands for Redundant Array of Independent Disks). The disk devices 415 are, for example, hard disk drives or solid state drives.

The storage controller 450 builds virtual volumes from the pool 411 and provides the virtual volumes to the host computers. Two virtual volumes 401A and 401B are illustrated in the example of FIG. 2. Each virtual volume has a virtualized capacity. The storage controller 450 allocates a unit storage area (page) from the pool to one of the virtual volumes each time one of the host computers requires a data storage area to write to the virtual volume. The logical volumes in the pool 411 are divided into a plurality of pages. The storage controller 450 manages the pool 411 on a page-by-page basis.

The storage apparatus 40A may provide actual volumes instead of virtual volumes to the host computers (OSes). The storage apparatus 40A may provide the host computers with a volume made up of pages in the pool and having an actual capacity that matches a capacity recognized by the host computers.

Figure 3:
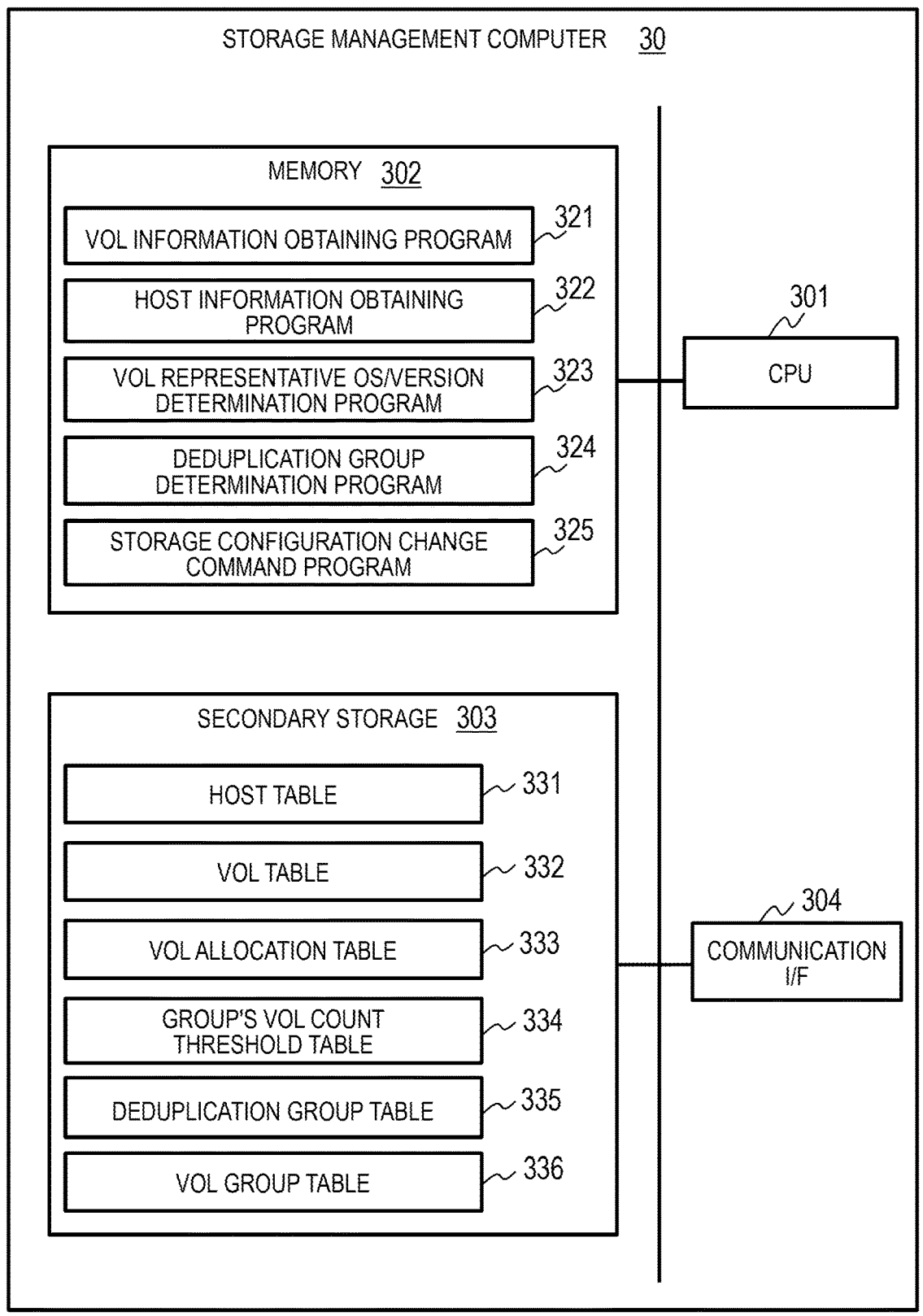
FIG. 3 is a diagram for illustrating a configuration example of the storage management computer.

FIG. 3 is a diagram for illustrating a configuration example of the storage management computer 30. The storage management computer 30 includes a CPU 301, a memory 302, a secondary storage 303, and a communication interface (I/F) 304. The CPU 301 is a processor configured to execute a program stored in the memory 302. The secondary storage 303 is made up of at least one storage device including, for example, a non-volatile storage medium. The communication I/F 304 is an interface to the management network, through which data and control commands are transmitted to and received from other apparatus for the purpose of system management. This description on the hardware configuration applies to other computers in the system as well.

In this example, the memory 302 stores a storage management program. The management program includes a VOL information obtaining program 321, a host information obtaining program 322, a VOL representative OS/version calculation program 323, a deduplication group determination program 324, and a storage configuration change command program 325.

The secondary storage 303 stores storage management information. The management information includes a host table 331, a VOL table 332, a VOL allocation table 333, a group's VOL count threshold table 334, a deduplication group table 335, and a VOL group table 336.

The programs are illustrated inside the memory 302 and the tables are illustrated inside the secondary storage 303 for the convenience of description. However, the programs and the tables are typically loaded from the storage area of the secondary storage 303 to the storage area of the memory 302 to be used by the CPU 301. The operation of the programs and details of the information held in the tables are described later.

Figure 4:
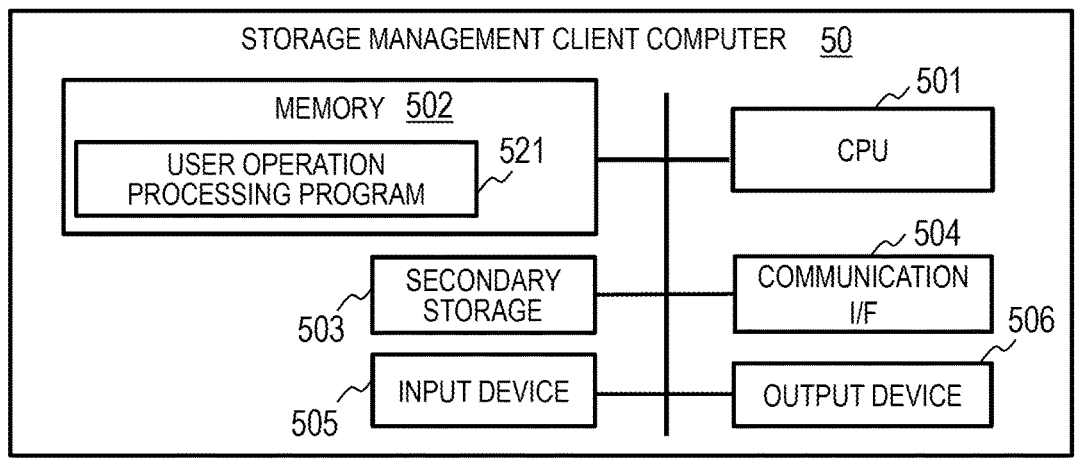
FIG. 4 is a diagram for illustrating a configuration example of the storage management client computer.

FIG. 4 is a diagram for illustrating a configuration example of the storage management client computer 50. An administrator (a user) operates the storage management computer 30 via the storage management client computer 50. The storage management client computer 50 includes a CPU 501, a memory 502, a secondary storage 503, a communication I/F 504, an input device 505, and an output device 506.

The CPU 501 executes a user operation processing program 521, which is stored in the memory 502, to provide a GUI to the administrator (user). The administrator inputs required data on the input device 505 while visually checking the result of processing on the output device 506. An example of a displayed image and an example of information input by the administrator are described later. The management apparatus may be constructed from one computer including an input/output device.

Figure 5:
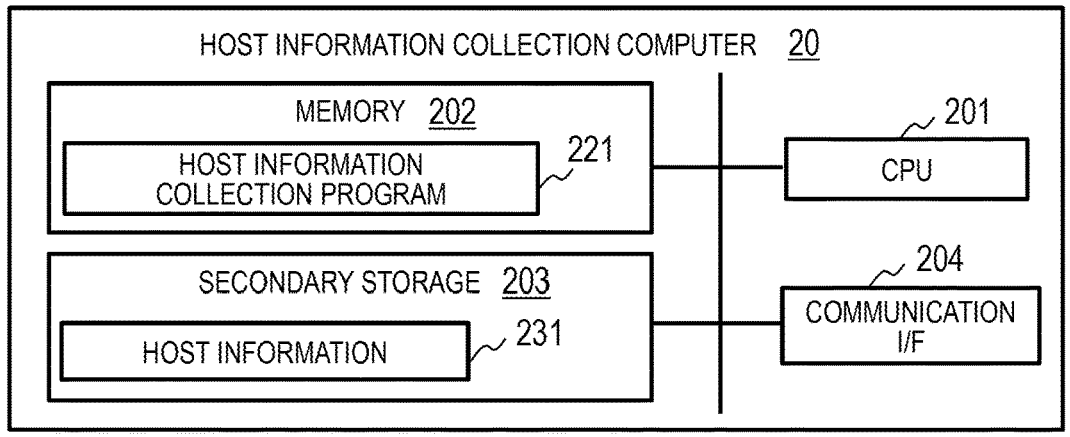
FIG. 5 is a diagram for illustrating a configuration example of the host information collection computer.

FIG. 5 is a diagram for illustrating a configuration example of the host information collection computer 20. The host information collection computer 20 includes a CPU 201, a memory 202, a secondary storage 203, and a communication I/F 204. The CPU 201 executes a host information collection program 221, which is stored in the memory 202. The host information collection program 221 collects, from each host computer, information about the software configuration of the host computer, specifically, information about an OS (including a hypervisor and an OS of a VM) to be executed and a volume in which the OS is stored. The host information collection program 221 stores the collected information in host information 231 inside the secondary storage 203.

Figure 6:
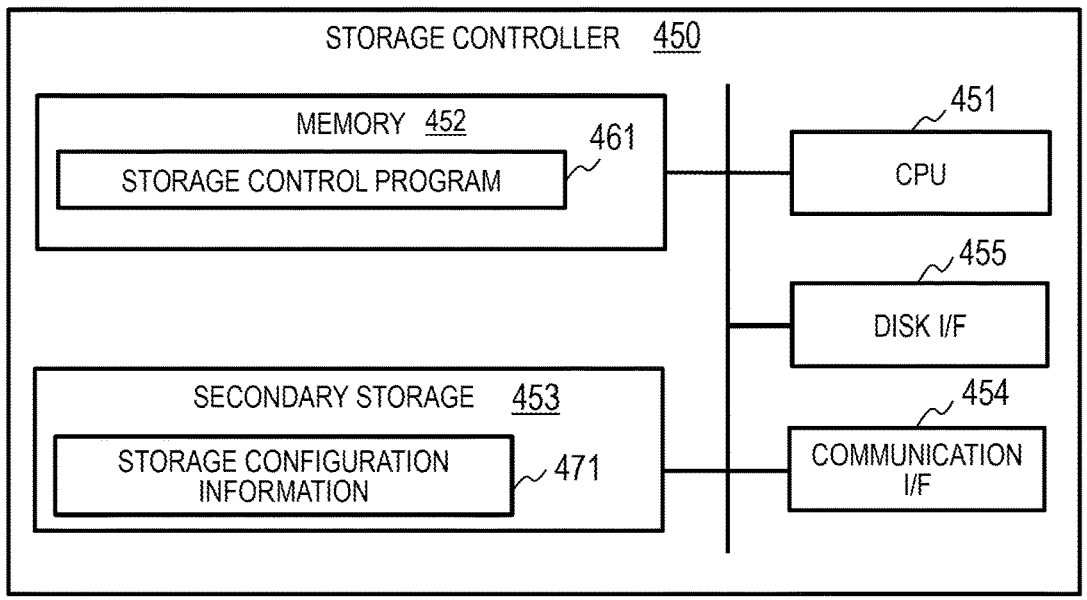
FIG. 6 is a diagram for illustrating a configuration example of the storage controller.

FIG. 6 is a diagram for illustrating a configuration example of the storage controller 450. The storage controller 450 includes a CPU 451, a memory 452, a secondary storage 453, a communication I/F 454, and a disk I/F 455. The communication I/F 454 is an I/F for communication over the data network and communication over the management network. The disk I/F 455 is an I/F for the disk devices 415.

The CPU 451, which is a processor, controls the storage apparatus by executing a storage control program 461, which is stored in the memory 452. The storage control program 461 generates and manages volumes, processes I/O requests from hosts, executes deduplication of volumes in a deduplication group, and executes other types of processing. Storage configuration information 471 includes information about volumes in the storage apparatus. The information about volumes includes, for example, information about virtual volumes, pools, pool volumes, and deduplication groups.

FIG. 7 is a table for showing a configuration example of the host table 331, which is kept on the storage management computer 30. The host table 331 is used to manage, for each host computer, information about a host program executed on the host computer, namely, an OS. The host table 331 includes a host identifier field, an OS type field, an OS version field, a hypervisor field, a hypervisor identifier field, and a VM-allocated capacity field.

The host identifier field indicates the identifier of a host (host program). The OS type field indicates the type of an OS of the host program. A hypervisor is a type of OS as described above. The OS version field indicates the version of the OS. A cell for a host program in the hypervisor field indicates whether the host program is a hypervisor. A value "TRUE" indicates that the host program is a hypervisor, and a value "FALSE" indicates that the host program is not a hypervisor. A cell for a guest OS in the hypervisor identifier field indicates the identifier of a hypervisor that manages the guest OS. The VM-allocated capacity field indicates a storage capacity allocated to a VM.

In the example of FIG. 7, a host program "BAR" is a hypervisor. Host programs "HOGE", "FUGA", "FOO", and "DAA" are guest OSes in VMs. The guest OSes are managed by the hypervisor "BAR". A host program "PIYO" is an OS running directly on the hardware of a host computer, and is the only OS executed by the host computer. Four OS types, namely, OS_A, OS_B, OS_C, and OS_D are shown in FIG. 7 as an example.

FIG. 8 is a table for showing a configuration example of the VOL table 332, which is kept on the storage management computer 30. The VOL table 332 is used to manage volumes provided by the storage apparatus to the host computers. The VOL table 332 includes a VOL identifier field, a VOL type field, and a storage identifier field. The VOL identifier field indicates the identifier of a volume in the storage apparatus. The VOL type field indicates the type of the volume.

The storage identifier field indicates the identifier of a storage apparatus that provides (includes) the volume. A combination of a value in the VOL identifier field and a value in the storage identifier field is an identifier by which a volume is identified within the system. This applies to other tables as well.

In this example, volumes are classified into a data store type and a standard type. A data store volume is a volume allocated to a hypervisor to store the hypervisor and an image file of a VM. A standard volume is a volume allocated to a single OS in a host computer to store data of the OS. A data store volume stores at least one OS, whereas a standard volume stores one OS.

FIG. 9 is a table for showing a configuration example of the VOL allocation table 333, which is kept on the storage management computer 30. The VOL allocation table 333 is used to manage host programs to which volumes are allocated. The VOL allocation table 333 includes a VOL identifier field, a host identifier field, and a storage identifier field. The VOL identifier field indicates the identifier of a volume in the storage apparatus. The storage identifier field indicates the identifier of a storage apparatus that provides (includes) the volume. The host identifier field indicates the identifier of a host (host program) to which the volume is allocated.

FIG. 10 is a table for showing a configuration example of the group's VOL count threshold table 334, which is kept on the storage management computer 30. The group's VOL count threshold table 334 indicates the minimum volume (VOL) count and maximum volume (VOL) count of a deduplication group. Numerical values in the group's VOL count threshold table 334 are set in advance by the administrator (user). The group's VOL count threshold table 334 is referred to when a deduplication group is created. The minimum volume (VOL) count and the maximum volume (VOL) count, which are common to all deduplication groups in this example, may be set to different numerical values for different deduplication groups.

FIG. 11 is a table for showing a configuration example of the deduplication group table 335, which is kept on the storage management computer 30. The deduplication group table 335 is used to manage deduplication groups. A deduplication group is made up of at least one volume, and data deduplication is executed within the deduplication group. In this example, a deduplication group is made up of virtual volumes to which actual storage areas are allocated from the same pool.

The deduplication group table 335 includes a group identifier field, an OS type field, an oldest version field, and a latest version field. The group identifier field indicates the identifier of a deduplication group. A cell for a deduplication group in the OS type field indicates the type of an OS allocated to the deduplication group. A volume can store a plurality of OSes as described later, and a representative OS is accordingly selected from among the OSes stored in the volume. A deduplication group is made up of volumes that have representative OSes of the same type, and the OS type field indicates the type of the representative OSes.

The oldest version field indicates the oldest version among the versions of representative OSes of volumes included in the deduplication group. The latest version field indicates the latest version among the versions of representative OSes of volumes included in the deduplication group.

FIG. 12 is a table for showing a configuration example of the VOL group table 336, which is kept on the storage management computer 30. The VOL group table 336 indicates each volume and a deduplication group that includes the volume. The VOL group table 336 includes a VOL identifier field, a storage identifier field, and a group identifier field. The group identifier field indicates the identifier of a deduplication group. A volume is identified by a value in the VOL identifier field and a value in the storage identifier field.

Figure 13:
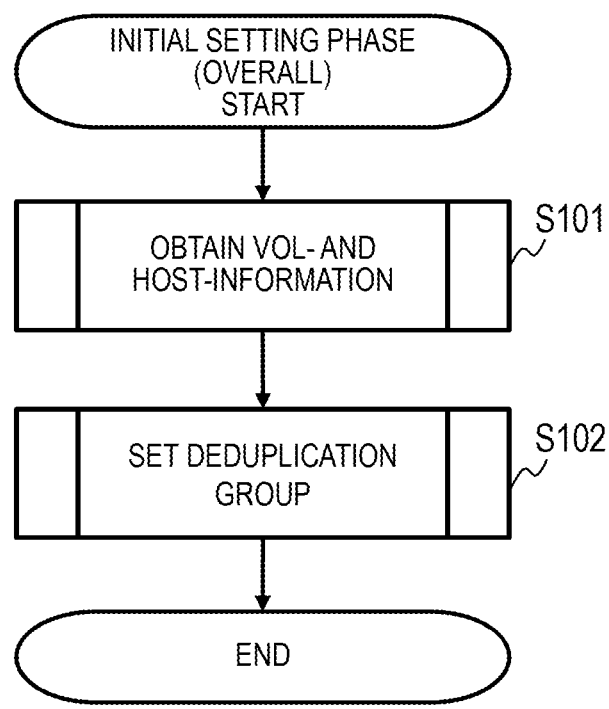
FIG. 13 is a flow chart of the overall initial setting phase.

Processing by the storage management computer 30 is described below. Processing by the storage management computer 30 includes an initial setting phase and an operation phase. The initial setting phase is described first. FIG. 13 is a flow chart of the overall initial setting phase.

The storage management computer 30 collects information about volumes and host in the computer system (Step S101). The storage management computer 30 next uses the collected information about volumes and hosts to determine a deduplication group, and sets the deduplication group in the storage apparatus 40A and 40B (Step S102).

Figure 14:
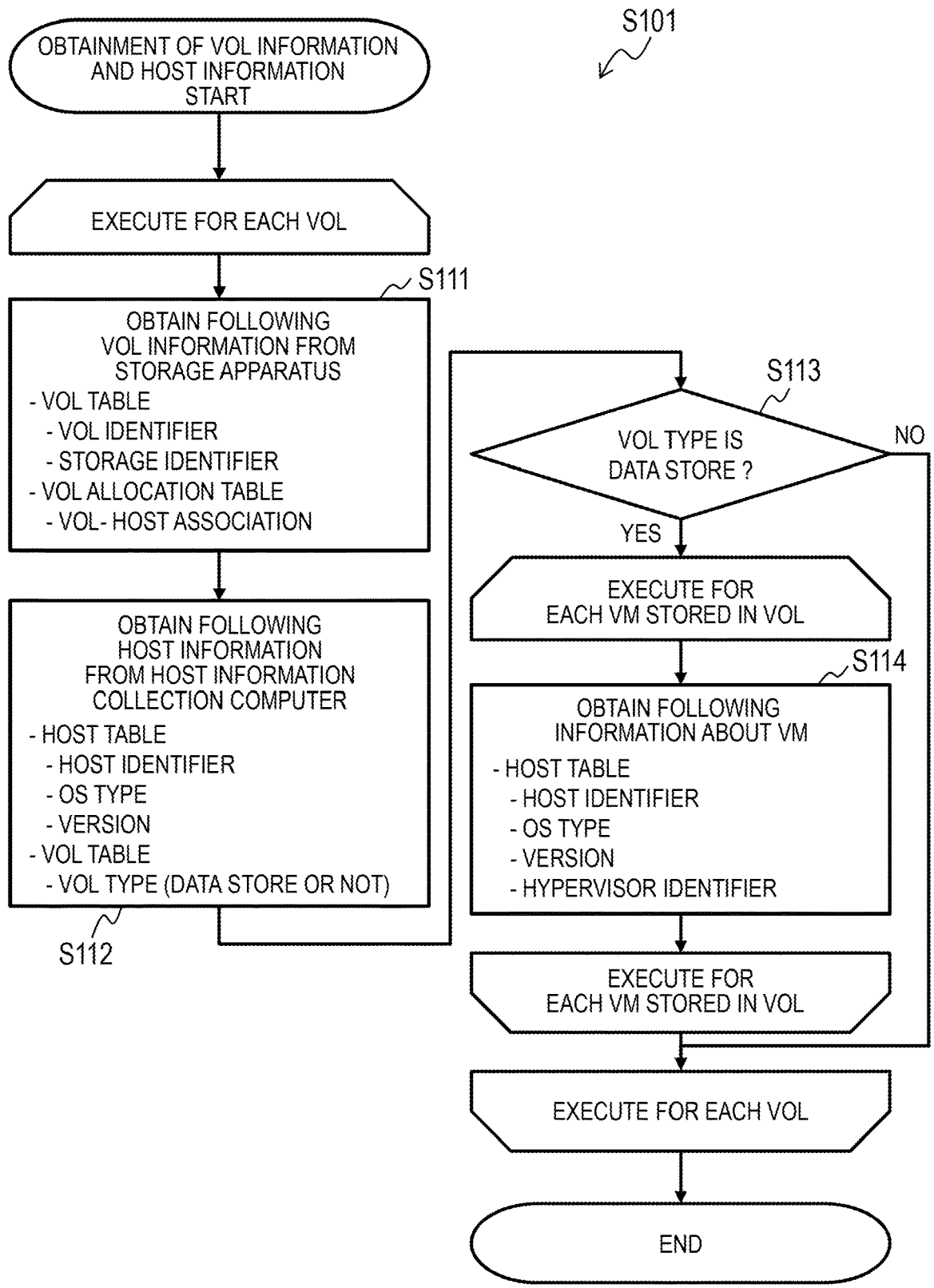
FIG. 14 is a flow chart of details of a step in which information about volumes and hosts is collected by the storage management computer.

FIG. 14 is a flow chart of details of Step S101, in which information about volumes and hosts is collected by the storage management computer 30. The storage management computer 30 executes Step S111 to Step S114 for each volume in the system. The storage management computer 30 executes Step S114 for each VM stored in the volume.

In Step S111, the VOL information obtaining program 321 obtains information about volumes from the storage apparatus 40A and 40B. Specifically, the VOL information obtaining program 321 obtains, for each volume, an identifier by which the volume is identified (a combination of a VOL identifier and a storage identifier) and the identifier of a host to which the volume is allocated (a host identifier).

The VOL information obtaining program 321 registers the obtained combination of a VOL identifier and a storage identifier to the VOL table 332 and the VOL allocation table 333. The VOL information obtaining program 321 registers the obtained host identifier in an entry for the associated volume. The allocation destination host is a hypervisor or a single OS on a host computer.

In Step S112, the host information obtaining program 322 obtains, from the host information collection computer 20, information about the allocation destination host obtained in Step S111. Specifically, the host information obtaining program 322 obtains the type and version of an OS of this host. The host information obtaining program 322 further obtains information about whether the host is a hypervisor, which builds a VM.

The host information obtaining program 322 registers the obtained information about the allocation destination host to the host table 331. The host information obtaining program 322 further registers one of values "DATA STORE" and "STANDARD" in the VOL type field of an entry for the associated volume in the VOL table 332. The volume type is data store when the allocation destination host is a hypervisor and, otherwise, standard.

In Step S113, the host information obtaining program 322 determines whether the volume type is data store. When the volume type is not data store (Step S113: "NO"), the host information obtaining program 322 selects the next volume.

When the volume type is data store (Step S113: "YES"), the host information obtaining program 322 executes Step S114. In Step S114, the host information obtaining program 322 obtains, from the host information collection computer 20, information about a VM stored in this volume.

Specifically, the host information obtaining program 322 obtains, for each VM, the host identifier, OS type, and OS version of the VM, the identifier of a hypervisor that builds and controls the VM, and a storage capacity allocated to the VM. The host information obtaining program 322 registers the information obtained for the VM to the host table 331.

Figure 15:
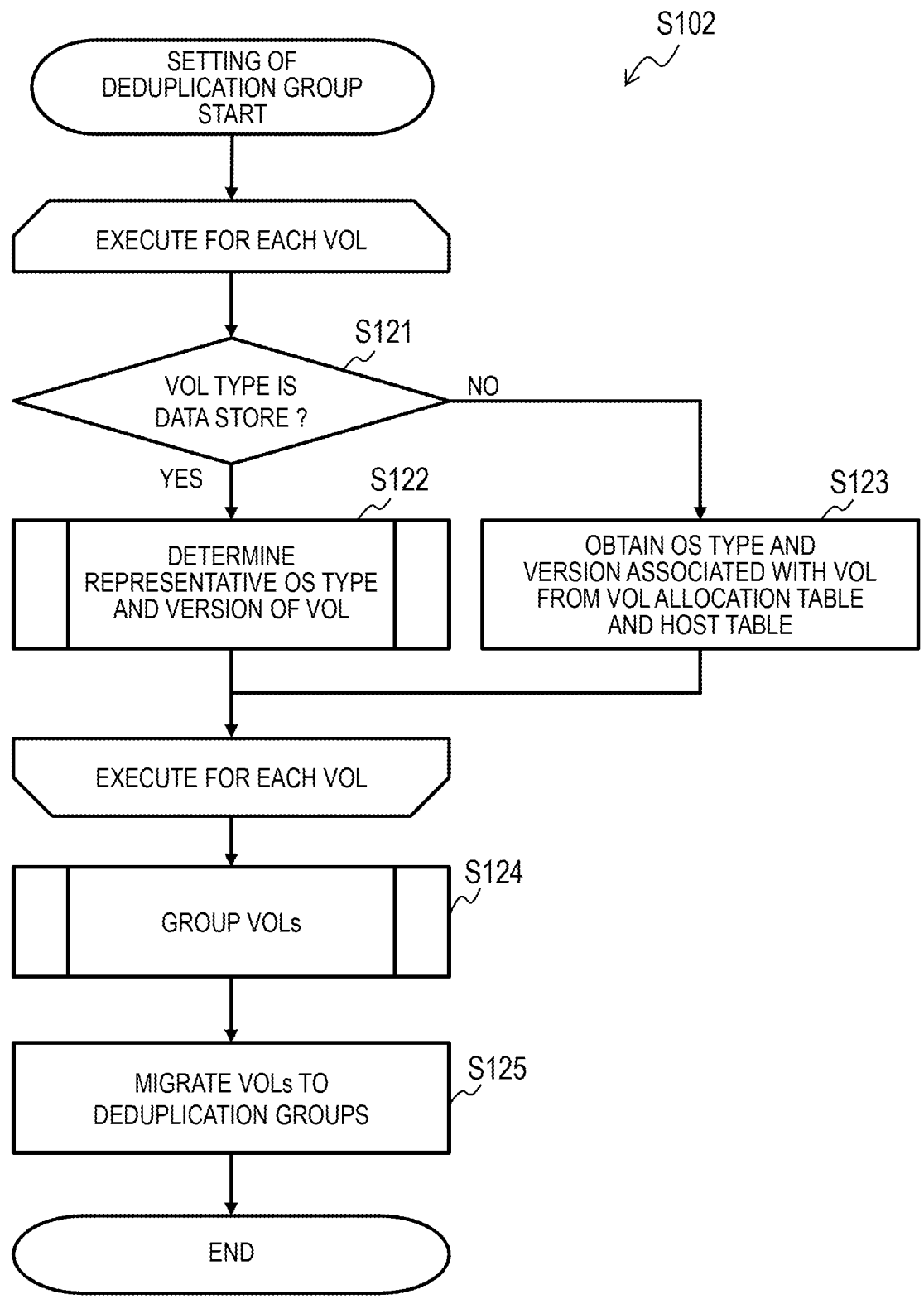
FIG. 15 is a flow chart of details of a step in which a deduplication group is set by the storage management computer.

FIG. 15 is a flow chart of details of Step S102, in which a deduplication group is set by the storage management computer 30. The storage management computer 30 executes Step S121 to Step S123 for each volume, and then executes Step S124 and Step S125. The deduplication group determination program 324 selects volumes one by one from the VOL table 332 to execute Step S121 to Step S123.

In Step S121, the deduplication group determination program 324 refers to the VOL table 332 to determine whether the type of the selected volume is data store. When the type of the volume is data store (Step S121: "YES"), that is, when an allocation destination host to which the volume is allocated is an OS that manages a VM, the deduplication group determination program 324 executes Step S122.

In Step S122, the deduplication group determination program 324 determines a representative OS type and version of the volume because a data store volume can store a plurality of OSes. Details of how a representative OS type and version of a volume are determined are described later with reference to FIG. 16.

When the type of the volume is not data store (Step S121: "NO"), that is, when an allocation destination host to which the volume is allocated is not an OS that manages a VM, the deduplication group determination program 324 executes Step S123.

In Step S123, the deduplication group determination program 324 obtains an OS type and version associated with this volume from the VOL allocation table 333 and the host table 331. The obtained OS type and version are the representative OS type and version.

In Step S124, the deduplication group determination program 324 determines, for each deduplication group, volumes included in the deduplication group. Details of how a deduplication group is determined are described later with reference to FIG. 17.

After deduplication groups are determined, Step S125 is executed. In Step S125, the storage configuration change command program 325 determines volumes required to migrate in order to form the deter mined deduplication groups, and instructs the storage apparatus 40A and 40B to migrate the volumes. In this example, volumes included in the same deduplication group are included in the same storage apparatus. One deduplication group may be defined by volumes in one pool.

Figure 16:
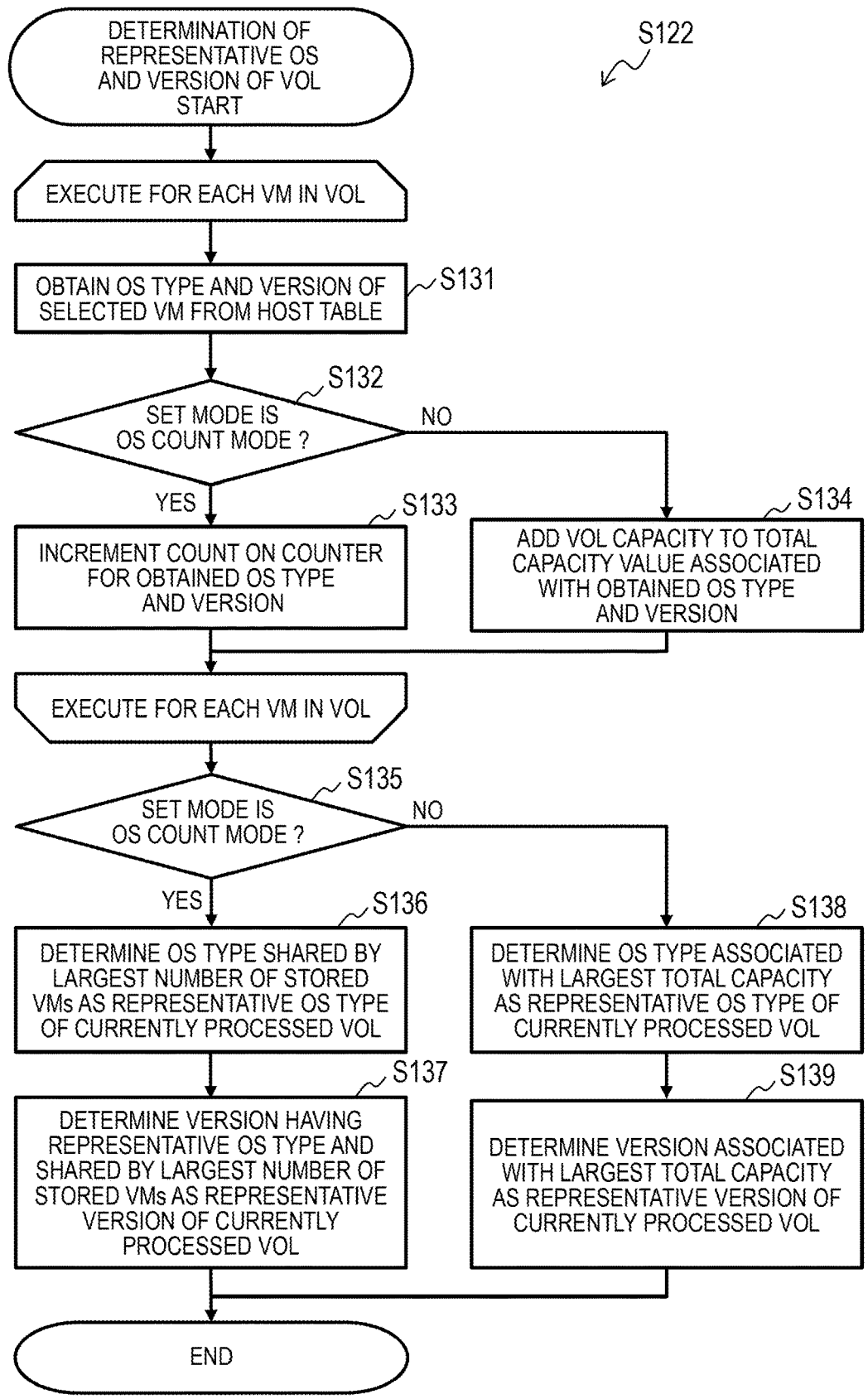
FIG. 16 is a flow chart of details of a step in which a representative OS type and version of a volume are determined by the deduplication group determination program.

FIG. 16 is a flow chart of details of Step S122, in which a representative OS type and version of a volume are determined by the deduplication group determination program 324. The deduplication group determination program 324 executes Step S131 to Step S134 for each VM stored in the volume. The deduplication group determination program 324 refers to the VOL allocation table 333 to identify a host (hypervisor) to which the volume is allocated. The deduplication group determination program 324 identifies VMs controlled by the identified host.

In Step S131, the deduplication group determination program 324 obtains the OS type and version of the selected VM from the host table 331. In Step S132, the deduplication group determination program 324 determines whether the mode set in advance is an OS count mode or an OS capacity mode.

When the set mode is the OS count mode (Step S132: "YES"), the deduplication group determination program 324 increments the count on a counter for the combination of the OS type and version of the VM in Step S133. When the set mode is the OS capacity mode (Step S132: "NO"), in Step S134, the deduplication group determination program 324 refers to a total capacity value, which is counted for each combination of an OS type and an OS version, and adds a capacity allocated to the VM to the total capacity value of the combination of the OS type and version of the VM.

After Step S131 to Step S134 are executed for every VM stored in the volume, the deduplication group determination program 324 executes Step S135. In Step S135, the deduplication group determination program 324 determines whether the set mode is the OS count mode or the OS capacity mode.

When the set mode is the OS count mode (Step S135: "YES"), the deduplication group determination program 324 executes Step S136. In Step S136, the deduplication group determination program 324 figures out an OS type that is shared by the maximum number of VMs stored in the volume, and determines this OS type as the representative OS type of the volume.

In Step S137, the deduplication group determination program 324 figures out a version that is shared by the maximum number of VMs stored in the volume and having the representative OS type, and determines this version as the representative version of the volume.

When the set mode is the OS capacity mode (Step S135: "NO"), the deduplication group determination program 324 executes Step S138. In Step S138, the deduplication group determination program 324 figures out an OS type that is associated with the maximum total allocated capacity among VMs stored in the volume, and determines this OS type as the representative OS type of the volume.

In Step S139, the deduplication group determination program 324 figures out a version that is associated with the largest total allocated capacity among VMs stored in the volume and having the representative OS type, and determines this version as the representative version of the volume.

By determining a representative OS following preset standards, an representative OS appropriate for the situation under which the system is used can be selected.

Figure 17:
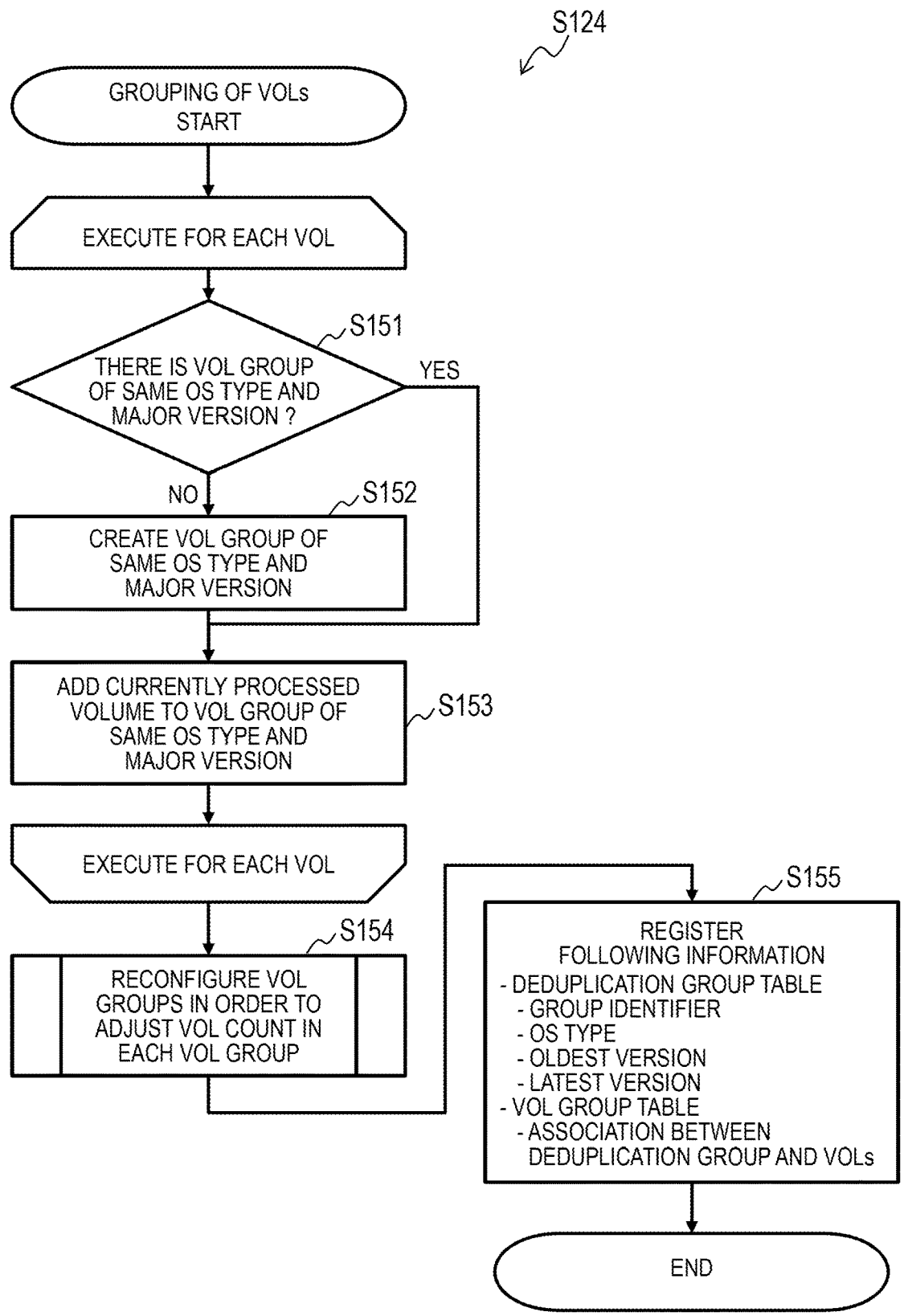
FIG. 17 is a flow chart of details of a step in which deduplication groups are configured by the deduplication group determination program.

FIG. 17 is a flow chart of details of Step S124, in which deduplication groups are configured by the deduplication group determination program 324. The deduplication group determination program 324 groups volumes by the volume's representative OS type and version determined in Step S122 and Step S123.

The deduplication group determination program 324 executes Step S151 to Step S153 for each volume. The deduplication group determination program 324 then executes Step S154 and Step S155.

In Step S151, the deduplication group determination program 324 determines whether there is a volume group that has the same OS type and major version as those of the selected volume's representative OS (whether this volume group is already created). The version of an OS is expressed by a numerical value including a decimal point, and the integral part indicates the major version while the decimal part indicates the minor version. In the case of "version 4.21", for example, the major version is 4 and the minor version is 0.21.

When no volume group fits the criterion (Step S151: "NO"), in Step S152, the deduplication group determination program 324 creates, a volume group to which the OS type and major version of the representative OS of the selected volume are assigned.

When there is a volume group fitting the criterion (Step S151: "YES"), or after a volume group fitting the criterion is newly created (Step S152), in Step S153, the deduplication group determination program 324 adds the selected volume to the volume group.

At least one volume group is configured in Step S151 to Step S153. In each volume group, representative OSes of volumes making up the volume group share the same OS type and major version.

Next, in Step S154, the deduplication group determination program 324 reconfigures volume groups in order to adjust the number of volumes in the at least one volume group configured in Step S151 to Step S153. The reconfigured volume groups are final deduplication groups.

The deduplication group determination program 324 breaks up a volume group having too many volumes, and integrates a volume group having too few volumes with another volume group. The number of volumes in each deduplication group is kept within a prescribed range in this manner, with the result that efficient deduplication is accomplished. Details of the deduplication group reconfiguration (Step S154) are described later.

Next, in Step S155, the deduplication group determination program 324 registers information about the determined deduplication groups to the deduplication group table 335 and the VOL group table 336. Specifically, the deduplication group determination program 324 registers, for each deduplication group, the identifier, OS type, oldest version, and latest version of the deduplication group to the deduplication group table 335. The deduplication group determination program 324 registers the identifier of each deduplication group to the VOL group table 336.

Figure 18:
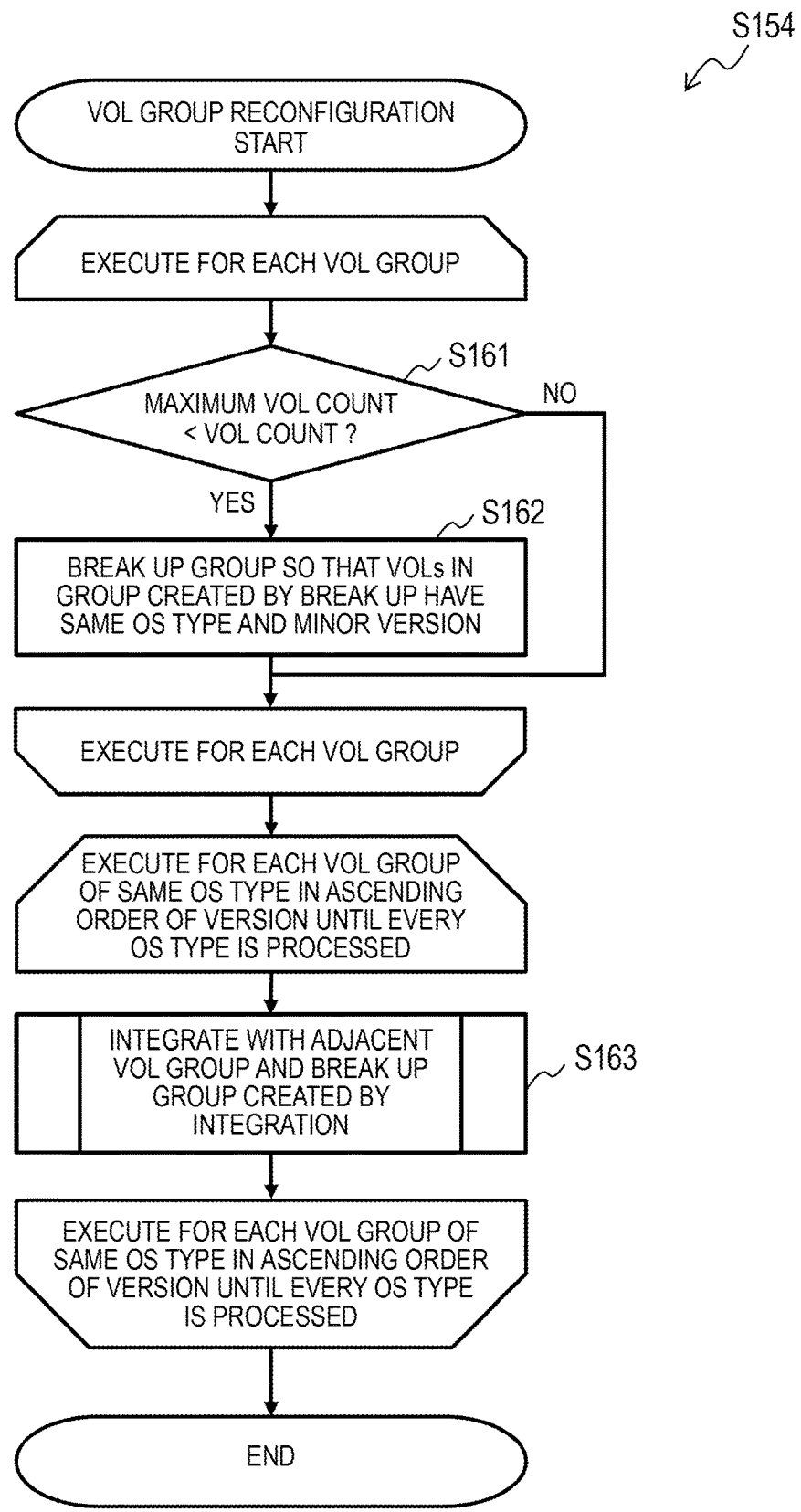
FIG. 18 is a flow chart of details of the volume group reconfiguration executed by the deduplication group determination program.

FIG. 18 is a flow chart of details of the volume group reconfiguration executed by the deduplication group determination program 324 (Step S154). The deduplication group determination program 324 selects the created volume groups one by one to execute Step S161 and Step S162 for each volume group. The deduplication group determination program 324 then executes Step S163.

In Step S161, the deduplication group determination program 324 determines whether the number of volumes making up the selected volume group is greater than a prescribed maximum volume count. The maximum volume count is registered in the group's VOL count threshold table 334 in advance.

When the number of volumes making up the selected volume group is equal to or less than the prescribed maximum volume count (Step S161: "NO"), the deduplication group determination program 324 selects the next volume group.

When the number of volumes making up the selected volume group is greater than the prescribed maximum volume count (Step S161: "YES"), in Step S162, the deduplication group determination program 324 breaks up this volume group. Specifically, the deduplication group determination program 324 divides volumes in the volume group by the minor versions of the representative OSes of the volumes.

The volume group before the breaking up is made up of volumes whose representative OSes have the same OS type and major version. Each of volume groups created by the breaking up is accordingly made up of volumes whose representative OSes have the same OS type and version. The version is defined by the combination of a major version and a minor version. The number of volumes in each volume group after Step S161 and Step S162 are executed for every volume is equal to or less than the prescribed maximum volume count.

The deduplication group determination program 324 next executes Step S163 repeatedly, to thereby reconfigure volume groups from post-breakup volume groups and adjust the number of volumes in a volume group. This reduces the number of volume groups whose volume count is outside the prescribed range.

Specifically, the deduplication group determination program 324 organizes volume groups that have the same OS type in the order of version, and integrates two volume groups whose volume counts are outside the prescribed range and whose OS versions are chronologically adjacent to each other into one volume group. The deduplication group determination program 324 breaks up the volume group created by the integration so that each of volume groups created by the breaking up has volumes in a number within the prescribed range.

Figure 19:
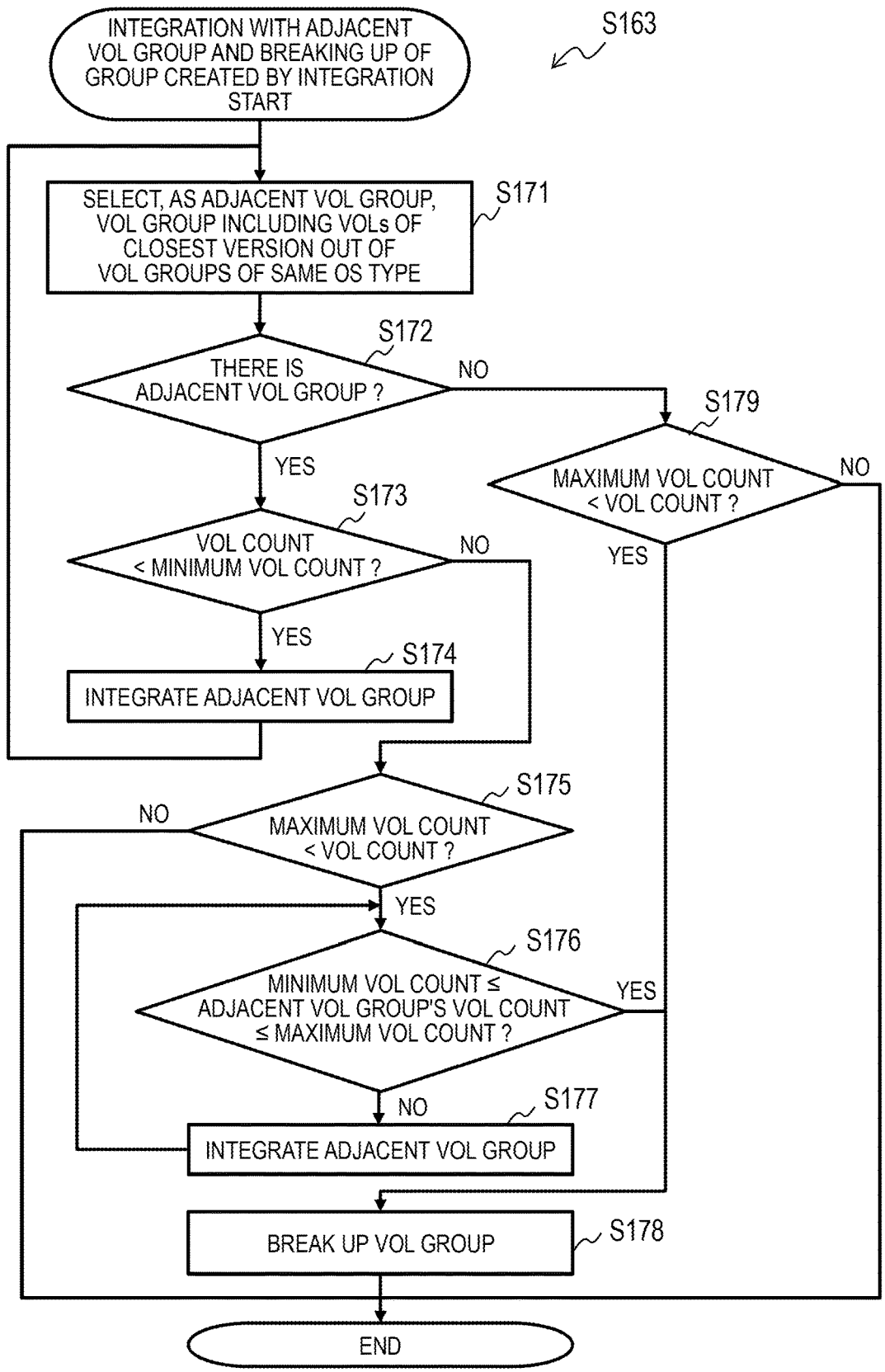
FIG. 19 is a flow chart of details of a step in which the number of volumes in a volume group is adjusted.

FIG. 19 is a flow chart of details of Step S163, in which the number of volumes in a volume group is adjusted. The deduplication group determination program 324 executes processing of this flow chart (Step S163) in volume groups of each OS type in ascending order of version.

In Step S171, the deduplication group determination program 324 selects a volume group adjacent to one selected volume group (a target volume group) in ascending order of version. The adjacent volume group is a volume group including volumes that have the same OS type as the OS type of the selected volume group and a version closest to the version of the selected volume group.

In Step S172, the deduplication group determination program 324 determines whether there is a volume qualifying as the adjacent volume group. When there is no volume group qualifying as the adjacent volume group (Step S171: "NO"), the target volume group is the last volume group of the currently processed OS type.

When there is no volume group qualifying as the adjacent volume group (Step S171: "NO"), in Step S179, the deduplication group determination program 324 compares the number of volumes in the target volume group against the prescribed maximum volume count.

When the number of volumes in the target volume group is greater than the prescribed maximum volume count (Step S179: "YES"), the deduplication group determination program 324 proceeds to Step S178 to break up the target volume group. Details of Step S178 are described later. When the number of volumes in the target volume group is equal to or less than the prescribed maximum volume count (Step S179: "NO"), the deduplication group determination program 324 exits this flow.

When a volume group qualifying as the adjacent volume group is found in Step S172 (Step S172: "YES"), in Step S173, the deduplication group determination program 324 compares the number of volumes in the target volume group against the minimum volume count prescribed in the group's VOL count threshold table 334.

When the number of volumes in the target volume group is less than the prescribed minimum volume count (Step S173: "YES"), in Step S174, the deduplication group determination program 324 integrates the adjacent volume group with the target volume group.

The deduplication group determination program 324 then returns to Step S171 to select a volume group adjacent to the integrated target volume group. The number of volumes in the integrated volume group is changed to a number equal to or greater than the prescribed minimum volume count by executing the loop of Step S171 to Step S174.

When the number of volumes in the selected volume group is equal to or greater than the prescribed minimum volume count (Step S173: "NO"), in Step S175, the deduplication group determination program 324 compares the number of volumes in the target volume group against the maximum volume count prescribed in the group's VOL count threshold table 334.

When the number of volumes in the selected volume group is equal to or less than the prescribed maximum volume count (Step S175: "NO"), the number of volumes in the integrated or unintegrated target volume group is within a range defined by the prescribed minimum volume count and the prescribed maximum volume count. Then, the deduplication group determination program 324 exits this flow.

When the number of volumes in the selected volume group is greater than the prescribed maximum volume count (Step S175: "YES"), in Step S176, the deduplication group determination program 324 compares the number of volumes in the adjacent volume group of the target volume group against the prescribed minimum volume count and the prescribed maximum volume count.

When the number of volumes in the adjacent volume group is outside the range defined by the prescribed minimum volume count and the prescribed maximum volume count (Step S176: "NO"), specifically, when the adjacent volume group has volumes in a number less than the minimum volume count or greater than the maximum volume count, in Step S177, the deduplication group determination program 324 integrates the adjacent volume group with the target volume group.

The deduplication group determination program 324 then returns to Step S176. By integrating volume groups whose volume counts are outside the prescribed range, a greater number of volumes are allocated to each volume group created by the subsequent breaking up of the integrated volume group, and the ratio of compression by deduplication is consequently improved.

When the number of volumes in the adjacent volume group is within the prescribed range (Step S176: "YES"), in Step S178, the deduplication group determination program 324 breaks up the target volume group by dividing its volumes by version in ascending order. The target volume group is broken up so that the number of volumes in each volume group created by the breaking up is equal to or less than the prescribed maximum volume count. With a volume group (deduplication group) made up of volumes whose OS versions match or are sequential, the ratio of compression by deduplication is improved.

In an example, the deduplication group determination program 324 breaks up the target volume group so that the breaking up creates as many volume groups as a number obtained by dividing the number of volumes in the target volume group by the prescribed maximum volume count and rounding up the quotient. The deduplication group determination program 324 determines the number of volume groups to be created by the breaking up so that each created volume group has an equal number of volumes. In other words, the maximum difference in volume count among the created volume groups is 1. The ratio of compression by deduplication is improved in this manner.

In another example, the deduplication group determination program 324 may configure every volume group created by breaking up the target volume group except one from the prescribed maximum number of volumes. The deduplication group determination program 324 may break up the target volume group so that the breaking up creates as many volume groups as a number obtained by dividing the number of volumes in the target volume group by the prescribed minimum volume count and rounding down the quotient.

FIG. 20A to FIG. 20E are diagrams for illustrating examples of the integration and breaking up of volume groups. In the examples, a minimum volume count of 10 and a maximum volume count of 1,000 are prescribed for each volume group.

Figure 20A:
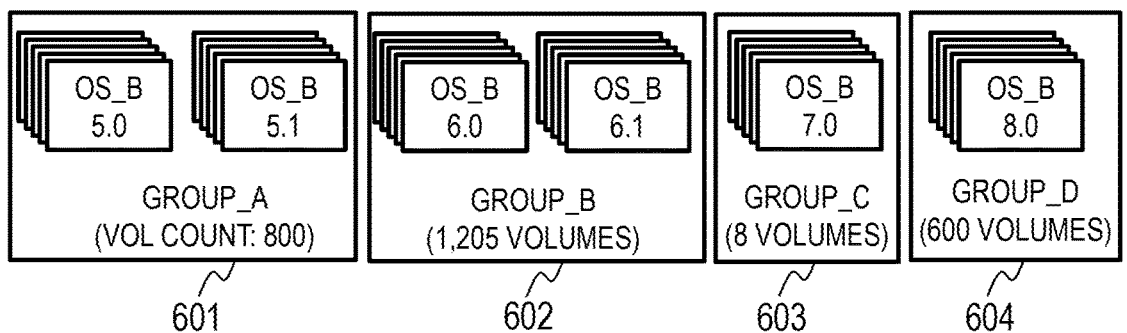
FIG. 20A is a diagram for illustrating an example of the integration and breaking up of volume groups.

FIG. 20A is a diagram for illustrating an example of volume groups that are created by dividing volumes by OS type and major version (Step S151 to Step S153). Four volume groups (GROUP_A 601 to GROUP_D 604) whose OS type is OS_B are illustrated in FIG. 20A. Volumes are organized in ascending order of version.

The volume group GROUP_A 601 includes 800 volumes whose OSes' major version is 5. The volume group GROUP_B 602 includes 1,205 volumes whose OSes' major version is 6. The volume group GROUP_C 603 includes 8 volumes whose OSes' major version is 7. The volume group GROUP_D 604 includes 600 volumes whose OSes' major version is 8.

Figure 20B:
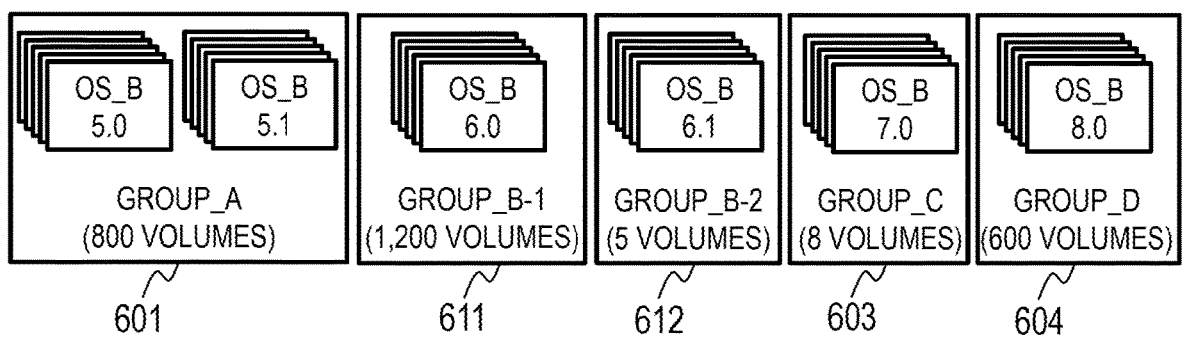
FIG. 20B is a diagram for illustrating an example of the integration and breaking up of volume groups.

In the example illustrated in FIG. 20B, a volume group that includes more volumes than the prescribed maximum volume count is broken up by dividing the volumes by minor version (Step S161 and Step S162). The prescribed maximum volume count is 1,000, and GROUP_B 602 is accordingly broken into two volume groups, namely, GROUP_B-1 (611) and GROUP_B-2 (612).

Figure 20C:
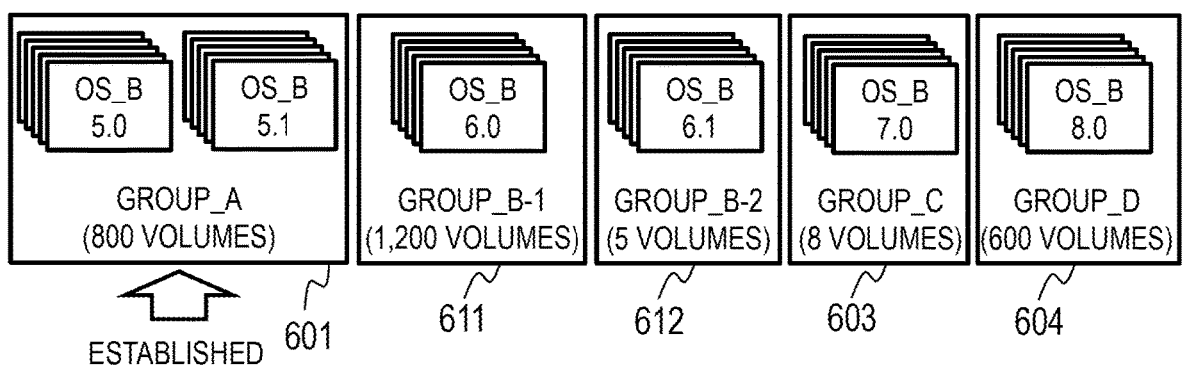
FIG. 20C is a diagram for illustrating an example of the integration and breaking up of volume groups.

In FIG. 20C, GROUP_A 601 is determined as a deduplication group. The volume count of GROUP_A 601 is 800, and fulfills the condition "minimum VOL count (10) VOL count (800) maximum VOL count (1,000)" (Step S173: "NO", Step S175: "NO").

Figure 20D:
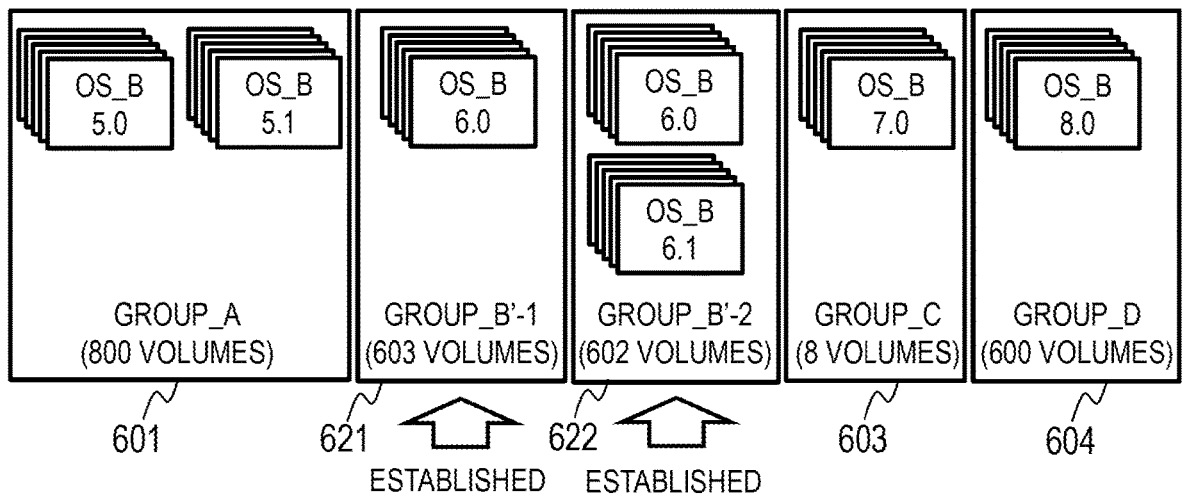
FIG. 20D is a diagram for illustrating an example of the integration and breaking up of volume groups.

In the example illustrated in FIG. 20D, the adjacent volume group is integrated (Step S177), and the volume group created by the integration is broken up (Step S178). The volume group GROUP_B-1 (611) has a volume count (1,200) higher than the prescribed maximum volume count (1,000) (Step S175: "YES"). Its adjacent volume group, namely, GROUP_B-2 (612), has a volume count (5) lower than the prescribed minimum volume count (10) (Step S176: "NO").

The volume groups GROUP_B-1 (611) and GROUP_B-2 (612) are accordingly integrated into one volume group (Step S177), and the volume group created by the integration is broken up (Step S178). Deduplication groups GROUP_B'-1 (621) and GROUP_B'-2 (622) are generated as a result of the breaking up.

Figure 20E:
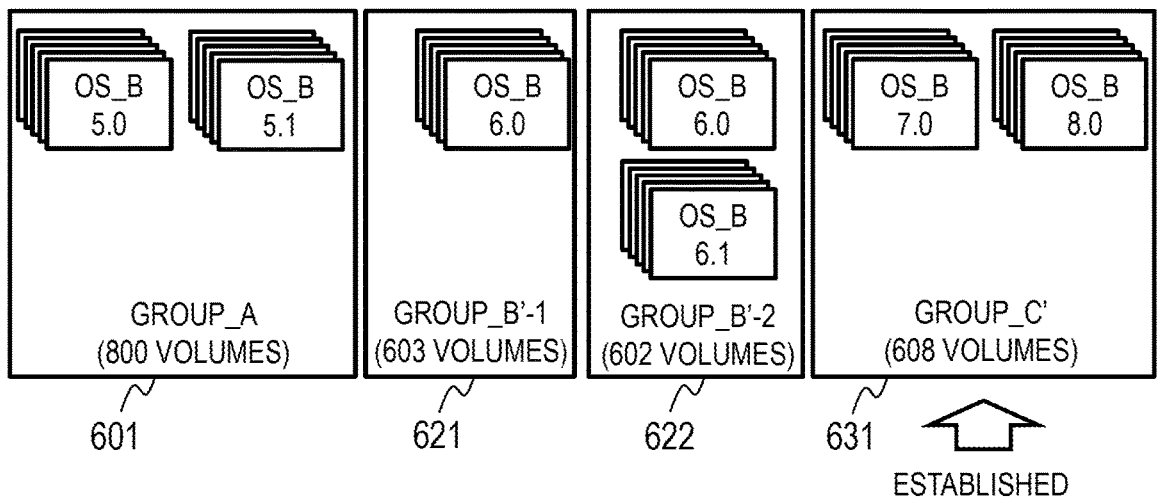
FIG. 20E is a diagram for illustrating an example of the integration and breaking up of volume groups.

In the example illustrated in FIG. 20E, the adjacent volume group is integrated (Step S174), and the volume group created by the integration is not broken up (Step S179: "NO"). The volume group GROUP_C 603 has a volume count (8) lower than the prescribed minimum volume count (10) (Step S173: "YES"), and is accordingly integrated with GROUP_D 604 (Step S174) to form GROUP_C' (631).

The volume group GROUP_C' (631) has a volume count (608) equal to or lower than the prescribed maximum volume count (1,000) (Step S179: "NO"), and is therefore established as a deduplication group. The volume group GROUP_C' (631) includes volumes having different major versions.

Figure 21:
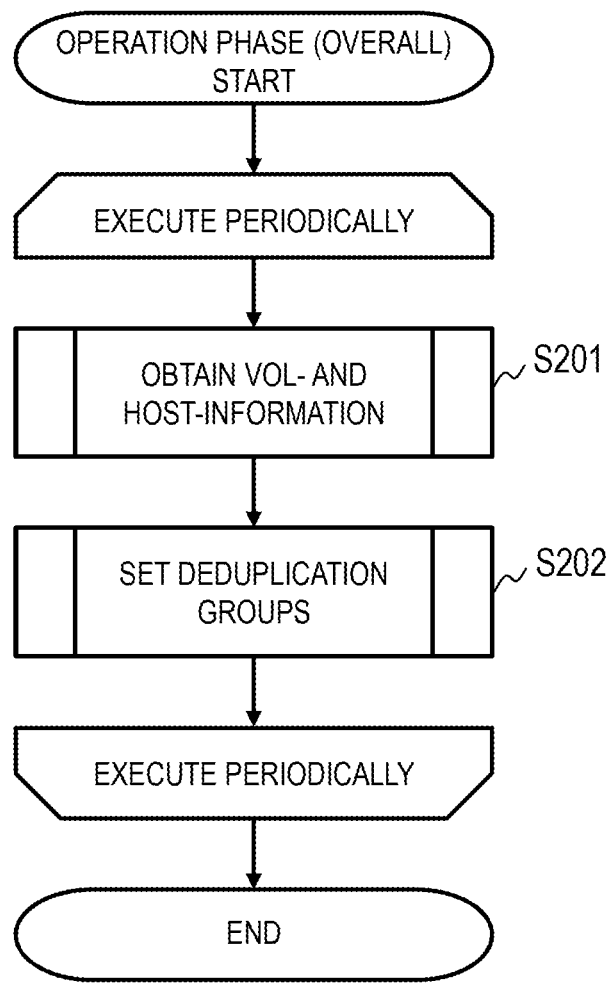
FIG. 21 is a flow chart of overall processing executed in the operation phase in response to a change in host configuration or a change to data stored in a volume.

FIG. 21 is a flow chart of overall processing executed in the operation phase in response to a change in host configuration or a change to data stored in a volume. Step S201 and Step S202 are executed periodically in the operation phase. The obtainment of VOL information and host information (Step S201) and the setting of a deduplication group (Step S202) are the same as the VOL- and host-information obtainment (Step S101) and deduplication group setting (Step S102) illustrated in FIG. 13.

Figure 22:
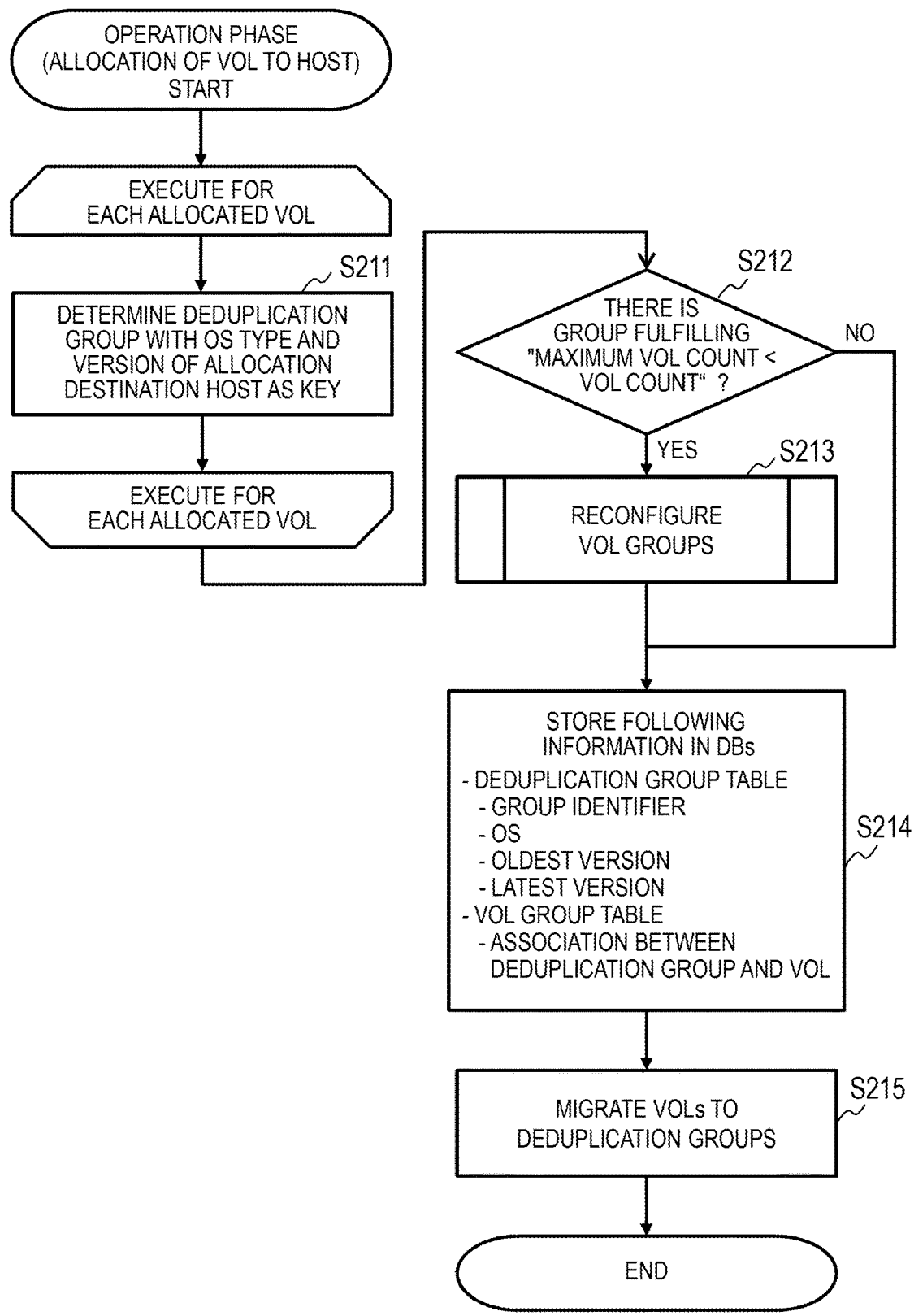
FIG. 22 is a flow chart of processing executed in the operation phase in response to the allocation of a volume to a host by the user.

FIG. 22 is a flow chart of processing executed in the operation phase in response to the allocation of a volume to a host by the user. When a volume is allocated to a host, the storage management computer 30 recommends a deduplication group for the allocated volume to belong to. The storage management computer 30 reconfigures deduplication groups as required.

The deduplication group determination program 324 executes Step S211 for each allocated volume. The deduplication group determination program 324 then executes Step S212 to Step S215.

In Step S211, the deduplication group determination program 324 determines a deduplication group for the allocated volume. The deduplication group determination program 324 identifies the OS type and version of an allocation destination OS to which the volume is allocated by referring to the VOL allocation table 333 and the host table 331. The deduplication group determination program 324 identifies a deduplication group that has the OS type and version of the allocated volume by referring to the deduplication group table 335.

In Step S212, the deduplication group determination program 324 determines whether there is a deduplication group whose volume count exceeds the prescribed maximum volume count. When no deduplication group fits the criterion (Step S212: "NO"), in Step S214, the deduplication group determination program 324 updates the deduplication group table 335 and the VOL group table 336. In Step S215, the deduplication group determination program 324 migrates required volumes to relevant deduplication groups.

When a deduplication group whose volume count exceeds the prescribed maximum volume count is found in Step S212 (Step S212: "YES"), the deduplication group determination program 324 executes Step S213. Step S213 is the same as Step S154. The deduplication group determination program 324 then executes Step S214 and Step S215.

Figure 23:
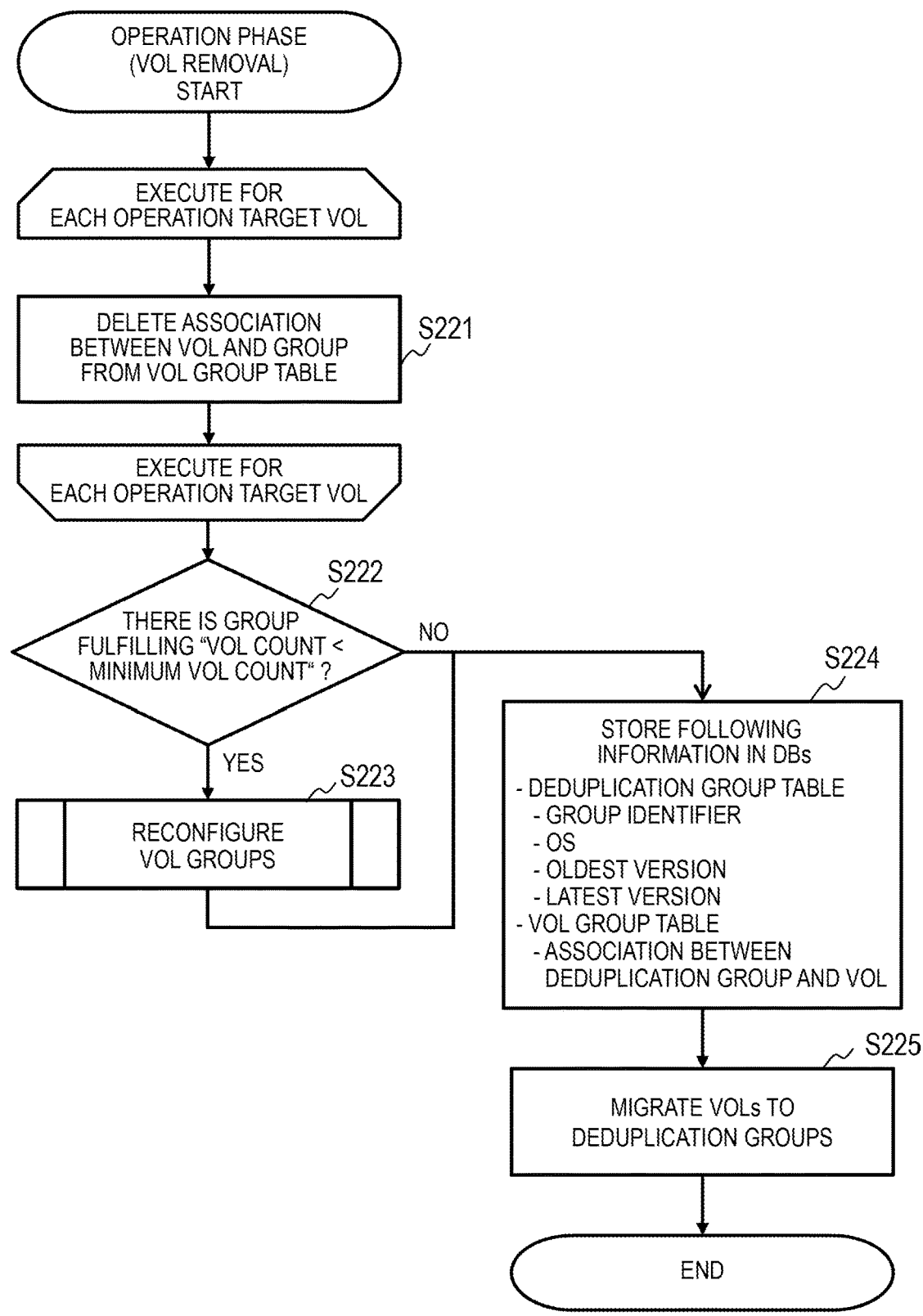
FIG. 23 is a flow chart of processing executed in the operation phase in response to the removal of a volume by the user.

FIG. 23 is a flow chart of processing executed in the operation phase in response to the removal of a volume by the user. When a volume is removed, the storage management computer 30 reconfigures deduplication groups.

The deduplication group determination program 324 executes Step S221 for each removed volume. The deduplication group determination program 324 then executes Step S222 to Step S225.

In Step S221, the deduplication group determination program 324 deletes information about the removed volume from the VOL group table 336. In Step S222, the deduplication group determination program 324 determines whether there is a deduplication group whose volume count is lower than the prescribed minimum volume count. When no deduplication group fits the criterion (Step S222: "NO"), in Step S224, the deduplication group determination program 324 updates the deduplication group table 335 and the VOL group table 336. In Step S225, the deduplication group determination program 324 migrates required volumes to relevant deduplication groups.

When a deduplication group whose volume count is lower than the prescribed minimum volume count is found in Step S222 (Step S222: "YES"), the deduplication group determination program 324 executes Step S223. Step S223 is the same as Step S154. The deduplication group determination program 324 then executes Step S224 and Step S225.

FIG. 24 is a diagram for illustrating an example of an image of a deduplication group list. Information about deduplication groups in a storage apparatus SA_A is illustrated in FIG. 24. The user operation processing program 521 outputs this image to the output device 506 in response to the user's operation of the input device 505. The user operation processing program 521 obtains, from the storage management computer 30, information to be displayed on a deduplication group list. The storage management computer 30 obtains information about volumes before and after compression by deduplication from the storage apparatus 40A and 40B.

FIG. 25 is a diagram for illustrating an example of an image of a deduplication group member volume list. Information about a deduplication group GR_B of the storage apparatus SA_A is illustrated in FIG. 25. The user operation processing program 521 outputs this image to the output device 506 in response to the user's operation of the input device 505.

FIG. 26 is a diagram for illustrating an example of an image for the allocation of a new volume by the user. The user operation processing program 521 outputs this image to the output device 506 and receives an input from the user via the input device 505. The user operation processing program 521 transmits the input information to the storage management computer 30. The input information is information about an allocation destination host to which the volume is allocated and information about the capacity of the volume.

The user operation processing program 521 obtains, from the storage management computer 30, information about a deduplication group recommended for the new volume to belong to, and displays the obtained information in this image. A deduplication group recommended for the new volume is presented to the user in this manner. The storage management computer 30 determines a deduplication group to which the new volume is to belong in the manner described with reference to FIG. 22, and transmits information about the determined deduplication group to the storage management client computer 50.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A management apparatus, which is configured to manage at least one storage system, the management apparatus comprising a processor and a memory,
   wherein each of the at least one storage apparatus includes a plurality of volumes, each of which stores at least one OS, and
   wherein the processor is configured to:
      determine, for each of the plurality of volumes, an OS type and version of a representative OS of the each of the plurality of volumes;
      select, from among the plurality of volumes, a plurality of volumes having representative OSes that share the same OS type and major version;
      include the selected plurality of volumes in one deduplication group made up of volumes among which deduplication is to be executed; and
      to form at least one deduplication group from the plurality of volumes so that each of the at least one deduplication group includes volumes in a number equal to or less than a prescribed volume count.

2. The management apparatus according to claim 1, wherein the processor is configured to:
   form each of the at least one deduplication group from volumes having representative OSes that have the same OS type.

3. The management apparatus according to claim 2, wherein the processor is configured to form each of the at least one deduplication group from volumes having representative OSes that have one of the same version and a plurality of sequential versions.

4. The management apparatus according to claim 1, wherein the processor is configured to present, for a new volume allocated to an OS, a volume group including volumes having representative OSes that have the same OS type and major version as an OS type and major version of the OS to which the new volume is allocated.

5. A management apparatus, which is configured to manage at least one storage system, the management apparatus comprising a processor and a memory,
   wherein each of the at least one storage apparatus includes a plurality of volumes, each of which stores at least one OS, and
   wherein the processor is configured to:
      determine, for each of the plurality of volumes, an OS type and version of a representative OS of the each of the plurality of volumes;
      select, from among the plurality of volumes, a plurality of volumes having representative OSes that share the same OS type and major version;
      include the selected plurality of volumes in one deduplication group made up of volumes among which deduplication is to be executed;
      sort the plurality of volumes into a plurality of first volume groups by a combination of an OS type and major version of each of the representative OSes;
      determine, as a deduplication group, a volume group having a constituent volume count that falls within a prescribed range out of the plurality of first volume groups, the prescribed range being equal to or more than a prescribed minimum volume count and equal to or less than a prescribed maximum volume count; and execute deduplication group reconfiguration by searching the plurality of first volume groups for a volume group having a constituent volume count that is outside the prescribed range, and forming each of at least one deduplication group from a number of volumes that are equal to or less than the prescribed maximum volume count and that have representative OSes of the same type and of one of the same version and a plurality of sequential versions.

6. The management apparatus according to claim 5, wherein the processor is configured to:

search the plurality of first volume groups for an oversized volume group, which has a constituent volume count that exceeds the prescribed maximum volume count, and sort volumes in each oversized volume group by minor version into a plurality of second volume groups; and search the plurality of first volume groups for an undersized volume group, which has a constituent volume count that is lower than the prescribed minimum volume count, and form the at least one deduplication group from the undersized volume group and the plurality of second volume groups.

7. The management apparatus according to claim 6, wherein the processor is configured to:

integrate volume groups having volumes that have the same OS type and sequential versions into one volume group, out of the undersized volume group and the plurality of second volume groups; and break up the volume group created by the integration to form the at least one deduplication group.

8. A management apparatus, which is configured to manage at least one storage system, the management apparatus comprising a processor and a memory, wherein each of the at least one storage apparatus includes a plurality of volumes, each of which stores at least one OS, and wherein the processor is configured to:

determine, for each of the plurality of volumes, an OS type and version of a representative OS of the each of the plurality of volumes;

select, from among the plurality of volumes, a plurality of volumes having representative OSes that share the same OS type and major version;

include the selected plurality of volumes in one deduplication group made up of volumes among which deduplication is to be executed;

sort, in a first volume including a plurality of OSes of a plurality of virtual machines, the plurality of OSes by combinations of an OS type and a version;

select a combination of an OS type and a version that is shared by the largest number of OSes in the plurality of sorted OSes; and determine the selected combination of an OS type and a version as a combination of an OS type and a version of a representative OS of the first volume.

9. The management apparatus according to claim 8, wherein the selected combination is of an OS type and a version that is associated with the largest total storage capacity allocated to the first volume, in the sorted plurality of virtual machines.

10. A management method for managing at least one storage system each including a plurality of volumes, each of which stores at least one OS, the management method comprising:

determining, for each of the plurality of volumes, an OS type and version of a representative OS of the each of the plurality of volumes;

selecting, from among the plurality of volumes, a plurality of volumes having representative OSes that share the same OS type and major version;

including the selected plurality of volumes in one deduplication group made up of volumes among which deduplication is to be executed; and forming at least one deduplication group from the plurality of volumes so that each of the at least one deduplication group includes volumes in a number equal to or less than a prescribed volume count.

11. The management method according to claim 10, further comprising:

forming each of the at least one deduplication group from volumes having representative OSes that have the same OS type.

12. The management method according to claim 11, further comprising forming each of the at least one deduplication group from volumes having representative OSes that have one of the same version and a plurality of sequential versions.

13. A management method for managing at least one storage system each including a plurality of volumes, each of which stores at least one OS, the management method comprising:

determining, for each of the plurality of volumes, an OS type and version of a representative OS of the each of the plurality of volumes;

selecting, from among the plurality of volumes, a plurality of volumes having representative OSes that share the same OS type and major version;

including the selected plurality of volumes in one deduplication group made up of volumes among which deduplication is to be executed; and sorting the plurality of volumes into a plurality of first volume groups by a combination of an OS type and major version of each of the representative OSes;

determining, as a deduplication group, a volume group having a constituent volume count that falls within a prescribed range out of the plurality of first volume groups, the prescribed range being equal to or more than a prescribed minimum volume count and equal to or less than a prescribed maximum volume count; and executing deduplication group reconfiguration by searching the plurality of first volume groups for a volume group having a constituent volume count that is outside the prescribed range, and forming each of at least one deduplication group from a number of volumes that are equal to or less than the prescribed maximum volume count and that have representative OSes of the same type and of one of the same version and a plurality of sequential versions.

* * * * *